(12) United States Patent
Yamamoto et al.

(10) Patent No.: US 6,556,210 B1
(45) Date of Patent: *Apr. 29, 2003

(54) IMAGE PROCESSING METHOD AND APPARATUS THEREFOR

(75) Inventors: Kunihiro Yamamoto, Yokohama; Kentaro Matsumoto, Higashikurume; Kiyoshi Kusama, Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/322,026

(22) Filed: May 28, 1999

(30) Foreign Application Priority Data

| May 29, 1998 | (JP) | 10-150007 |
| May 29, 1998 | (JP) | 10-150011 |
| May 29, 1998 | (JP) | 10-150012 |
| May 29, 1998 | (JP) | 10-150227 |
| Apr. 26, 1999 | (JP) | 10-118629 |
| Apr. 26, 1999 | (JP) | 10-118630 |

(51) Int. Cl.[7] ......................... G06T 11/00; G06F 17/00; G06F 16/30; G09G 5/36
(52) U.S. Cl. .............. 345/582; 345/552; 345/589; 345/549; 345/418; 358/518; 358/530; 382/232; 382/252; 382/274
(58) Field of Search .................. 345/418, 419, 345/423, 420, 582, 604, 583, 584, 552, 589, 549, 545; 382/284, 296, 294, 232, 154, 252, 254, 274–276, 286; 348/273, 278, 36, 415; 358/530, 515, 516, 518, 519, 520, 523, 527, 534, 536–540, 476

(56) References Cited

U.S. PATENT DOCUMENTS 5,187,754 A * 2/1993 Currin .................. 382/54

(List continued on next page.)

FOREIGN PATENT DOCUMENTS

| EP | 0 261 561 A1 | 3/1988 | |
| EP | 852 363 A2 * | 12/1997 | ......... G06T/11/00 |
| EP | 0 829 378 A2 | 3/1998 | |
| EP | 0852363 | 7/1998 | |

OTHER PUBLICATIONS

Finkelstein A. et al: "Image Mosaics", Lecture Notes in Computer Science, US, Springer Verlag, New York, NY, No. 1375, Mar. 1998, pp. 11–22.
Knowlton K et al: "Computer–Produced Grey Scales", Visible Language, Visible Language, Cleveland, OH, Mar. 1977, pp. 38–49.

*Primary Examiner*—Matthew Luu
*Assistant Examiner*—Wesner SaJous
(74) *Attorney, Agent, or Firm*—Fitzpatrick, Cella, Harper & Scinto

(57) ABSTRACT

Image processing method and apparatus for combining a plurality of texture images and generating a mosaic image. A first image serving as an original image is divided into a plurality of tile areas; a texture image having a minimum difference between the average luminance of R, G and B tristimulus values in each tile area and average luminance of R, G and B tristimulus values in each texture image is selected; and a mosaic image is produced by substituting the tile area by the selected texture image. In determination of the texture image, L*a*b* space parameters of each tile area and each texture image are compared and a texture image having the closest space parameter is selected as the image for the corresponding tile area, and a mosaic image is generated.

52 Claims, 26 Drawing Sheets

U.S. PATENT DOCUMENTS

| | | | | |
|---|---|---|---|---|
| 5,515,456 A | * | 5/1996 | Ballard | 382/252 |
| 5,581,373 A | | 12/1996 | Yoshida | 358/476 |
| 5,706,481 A | * | 1/1998 | Hannah et al. | 345/419 |
| 5,877,771 A | * | 3/1999 | Drebin et al. | 345/586 |
| 5,889,554 A | * | 3/1999 | Mutze | 348/273 |
| 5,898,461 A | | 4/1999 | Ohsawa et al. | 348/415 |
| 5,940,192 A | * | 8/1999 | Ichikawa | 358/530 |
| 5,986,668 A | * | 11/1999 | Szeliski | 345/433 |
| 6,018,349 A | * | 1/2000 | Szeliski | 345/425 |
| 6,097,854 A | * | 1/2000 | Szeliski | 345/435 |
| 6,151,035 A | * | 11/2000 | Okada | 345/509 |
| 6,157,747 A | * | 12/2000 | Szeliski | 345/435 |
| 6,292,589 B1 | * | 9/2001 | Chow | 382/239 |
| 6,326,976 B1 | * | 12/2001 | Huettner | 345/582 |

* cited by examiner

203
TEXTURE IMAGES
(P SHEETS)

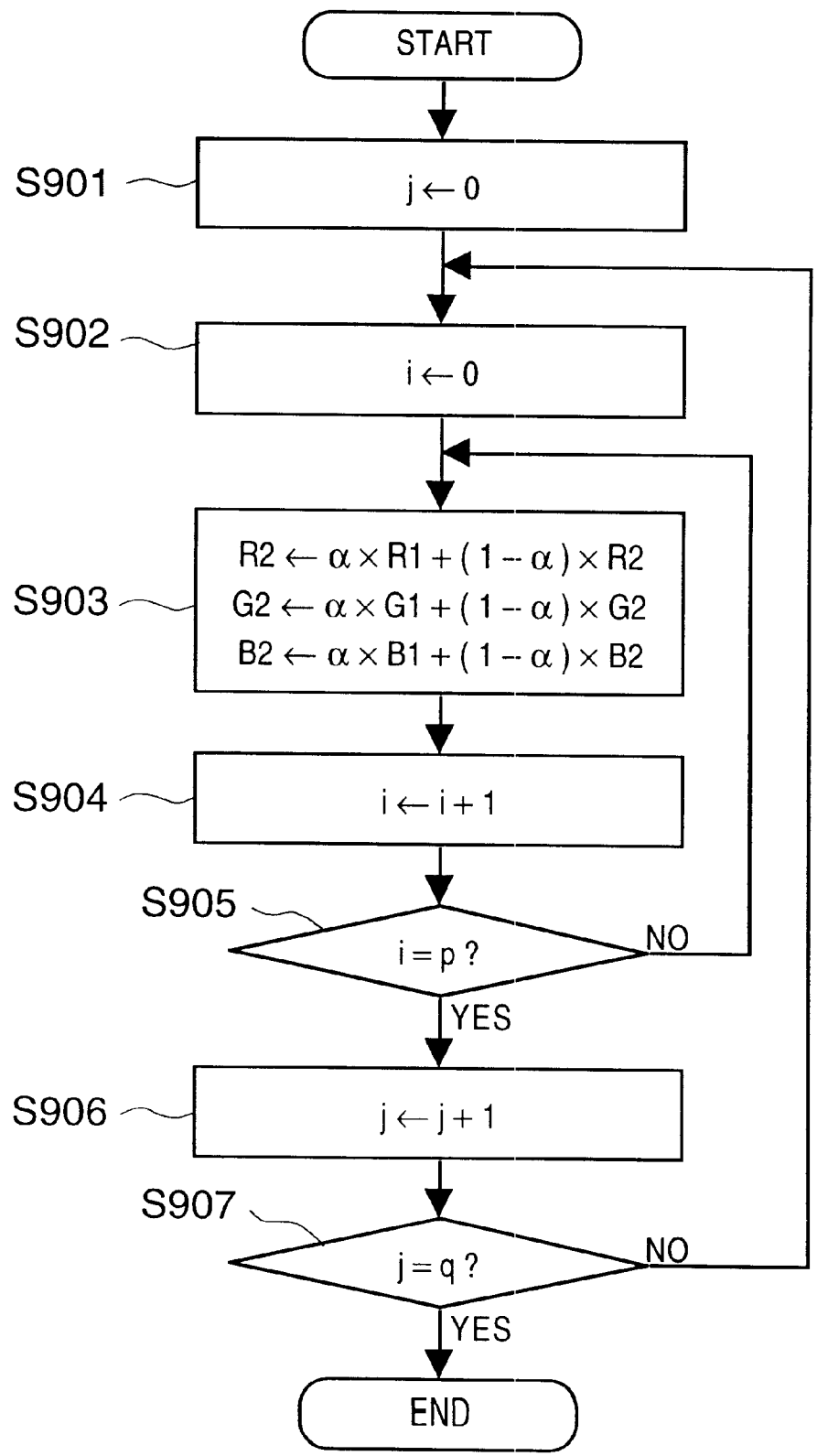

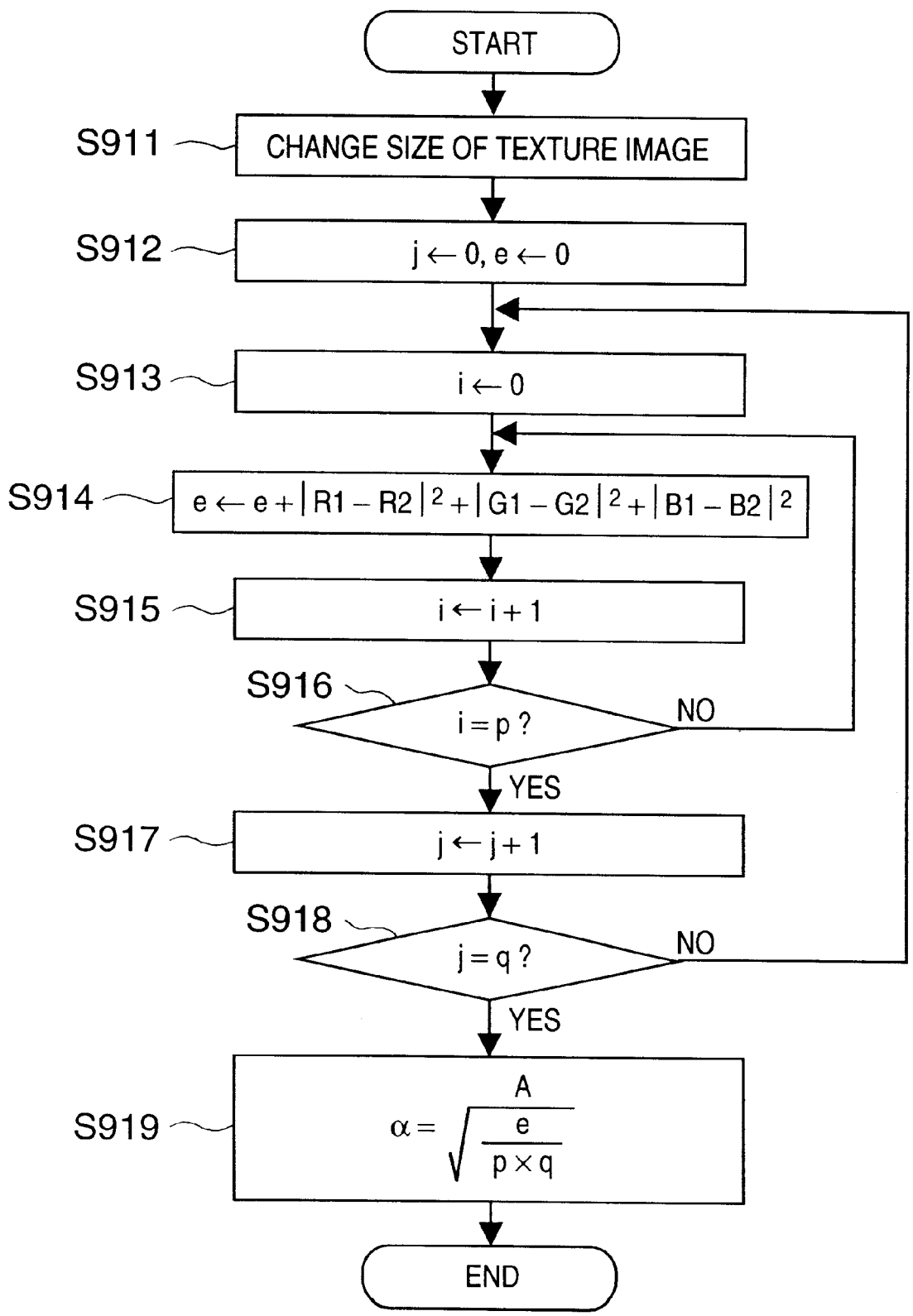

IMAGE PROCESSING METHOD AND APPARATUS THEREFOR

BACKGROUND OF THE INVENTION

The present invention relates to an image processing method and apparatus thereto for generating a mosaic image by combining a plurality of texture images.

Mosaic is widely known as "a pattern produced by, or the technique of producing a pattern by combining small pieces of colored stone, glass, marble, etc., and fitting into a floor or wall or the like (Contemporary Japanese Dictionary, Sanseido)." Employing this technique, a pattern or a photographic image can be formed with a combination of a plurality of photographic images.

By applying such mosaic technique to image data processing, it is possible to form a mosaic image by replacing an original image with a plurality of texture images (tile images). More specifically, plural types of texture images which are smaller than the original image are prepared in advance. By selecting and arranging appropriate images according to the original image, a mosaic image consisting of a plurality of texture images can be produced.

To generate a mosaic image, an original image is divided into a plurality of areas, and in each of the areas, a texture image which will construct the mosaic image is pasted. However, if the pasted texture image does not have a similar color to the corresponding area of the original image, the produced mosaic image will appear completely different from the original image, and also the image quality of the mosaic image deteriorates.

Moreover, in generation of a mosaic image, if a texture image includes an edge component, or if a divided area of the original image includes an edge component or special color distributions, it is difficult to perform proper color matching between the area and the texture image and the generated mosaic image is deteriorated.

Furthermore, in the above-described mosaic technique, it is necessary to prepare a sufficiently large number of colors and types of texture images to construct a mosaic image in general. However in reality, it is difficult to prepare an excessive amount of texture images as an image file in advance. Furthermore, in order to store such texture images in advance, an extremely large amount of storage is required, which results in cost increase, thus is not practical. Because of the above reasons, a sufficient number of texture images cannot be used when implementing the above-described mosaic technique. As a result, texture images which construct the mosaic image sometimes have far different colors and/or textures from those of respective areas of the original image, and the quality of a produced mosaic image is deteriorated.

SUMMARY OF THE INVENTION

The present invention is made in consideration of the above situation, and has as its object to provide an image processing method and apparatus for producing a mosaic image by combining texture images having similar colors to that of an original image.

Furthermore, another object of the present invention is to provide an image processing method and apparatus for diffusing density difference between a divided area of an original image and a texture image to peripheral areas of the area, so as to generate a mosaic image where density difference between the original image and an entire produced mosaic image is reduced.

Furthermore, another object of the present invention is to provide an image processing method and apparatus for producing a high-quality mosaic image while maintaining density characteristics of an original image.

Still further, another object of the present invention is to provide an image processing method and apparatus for producing a mosaic image where characteristics of an original image are best expressed, by further dividing divided areas (tile areas) of the original image into a plurality of segment areas, then dividing a texture image into a plurality of segment areas, and producing a mosaic image by using a texture image having a minimum total average density difference between the segment areas of the original image and the segment areas of the texture image, with respect to an area (tile area).

Moreover, another object of the present invention is to provide an image processing method and apparatus capable of producing a mosaic image based on an original image while maintaining characteristics of color distribution in the original image.

Still further, another object of the present invention is to provide an image processing method and apparatus capable of producing a mosaic image which best expresses a diversity of an original image by using a small number of texture images.

Furthermore, another object of the present invention is to provide an image processing method and apparatus for producing a mosaic image which is visually natural.

When comparing a divided area (tile area) of an original image with each texture image, average luminance or average density per pixel is calculated with respect to three primary colors: red (R), green (G) and blue (B) for each texture image and a divided area subjected to processing, and a texture image having a minimum difference in the average luminance or average density is selected as a texture image of the subject divided area.

Furthermore, an L*a*b* color space parameter is obtained for each texture image and a divided area subjected to processing, and a texture image having a minimum difference in the L*a*b* color space parameters is selected as a texture image of the subject divided area.

If an original image is a monochrome image and texture images are color images, texture image selection is performed based on average luminance or average density per pixel with respect to three primary colors R, G, and B for each texture image, while if an original image is a color image, texture image selection is performed based on the L*a*b* color space parameter.

According to the present invention, when a texture image for the subject divided area is selected as described above, a difference (error) in the average luminance or average density between the divided area and the selected texture image is calculated. The error is diffused to neighboring divided areas of the subject divided area. Based on the average luminance or average density of the neighboring divided area which has been updated by the error diffusion process, a texture image corresponding to each divided area is selected sequentially.

Furthermore, according to the present invention, in order to best express characteristics of an image included in each of the divided areas and texture images, the divided areas and texture images are further divided into a plurality of segment areas respectively, and average luminance or average density for each of R, G and B is obtained for each segment area of both the divided image and texture image. Then, a texture image having a minimum difference in the average luminance or average density for each color from a subject divided area is selected as a texture image of the subject divided area.

Moreover, according to the present invention, when a mosaic image is produced by selecting a texture image for each divided area as described above, a selected texture image of the produced mosaic image is modified by calculation based on a predetermined coefficient, the selected texture image and the corresponding divided area of the original image, then the modified texture image substitutes for the selected texture image. By this, a mosaic image which best expresses characteristics of the original image can be produced.

It is preferable that the value of the predetermined coefficient be changed by operation of an operator. Furthermore, the coefficient can automatically be obtained based on a color difference between the selected texture image and the corresponding divided area of the original image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 25 is a flowchart showing a correction process of a texture image to be synthesized based on the value α according to the eighth embodiment; and FIG. 26 is a flowchart showing a setting process of a most appropriate value α according to the ninth embodiment.

DETAILED DESCRIPTION OF THE PREFERRED EMBODIMENTS

Preferred embodiments of the present invention will be described in detail in accordance with the accompanying drawings.

Figure 1:
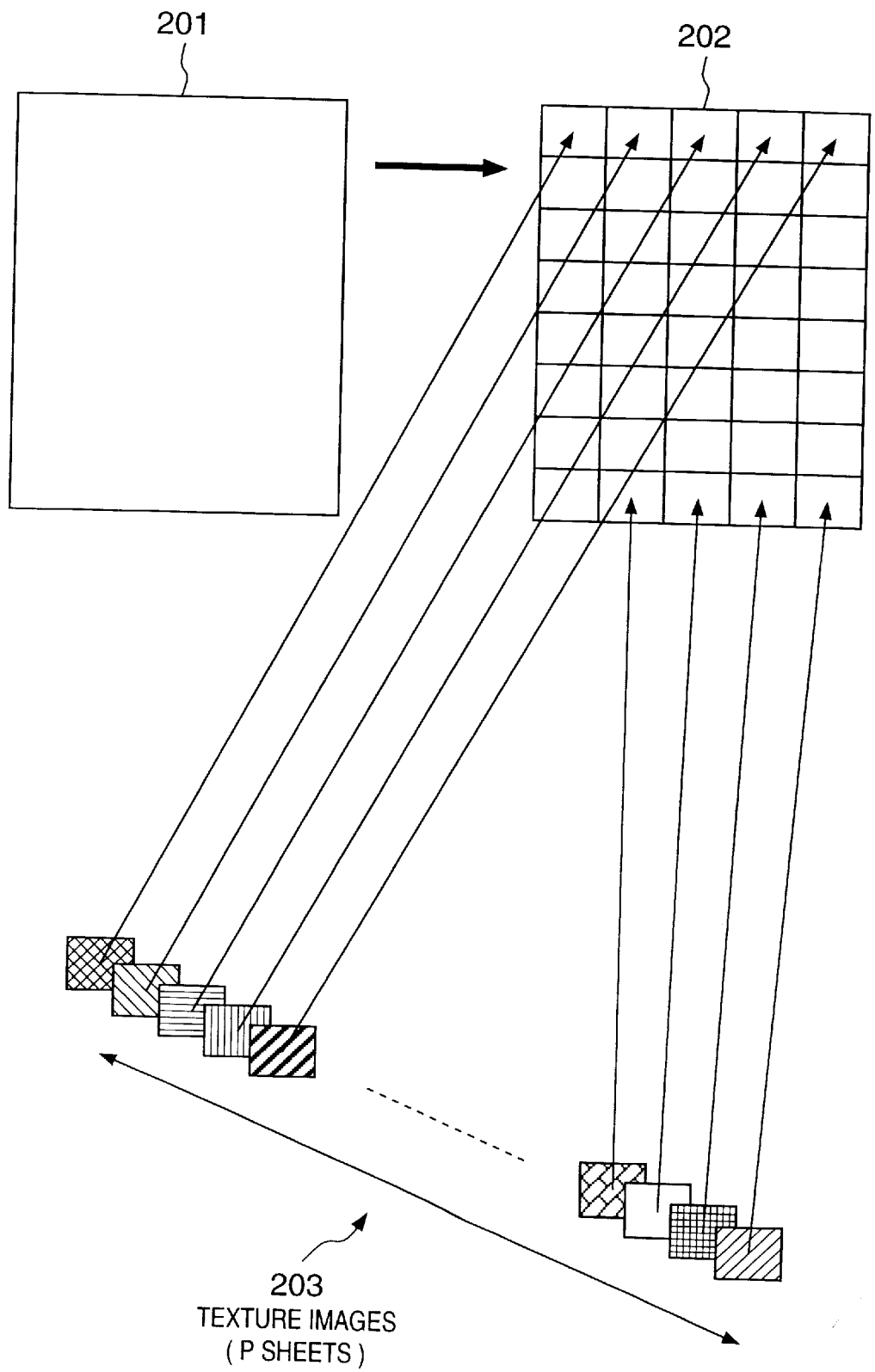
FIG. 1 is a conceptual view for explaining generation of a mosaic image according to the present embodiment.

FIG. 1 is a conceptual view for explaining producing process of a mosaic image using the mosaic technique according to the present embodiment.

Referring to FIG. 1, a first image 201 (original image) is an original pattern or an original image used when a mosaic image is constructed by using the mosaic technique. A second image 202 is a mosaic image produced by the mosaic technique according to the present embodiment. Texture images 203 are used for producing the second image 202. It is assumed herein that a sufficient number (P) of the texture images 203 is prepared to cover the colors and textures generally necessary to produce the second image 202. Note that, for explanatory convenience, each of the P sheets of texture images 203 has the same size as each area (tile area) of the first image 201 divided into a plurality of areas. However, each of the texture images 203 does not have to be of the same size as the tile area. Moreover, all the P sheets of texture images 203 do not always have to be of the same size. In a case where a texture image is pasted on a tile area but the size of the texture image does not match the size of the tile area, the size of the texture image needs to be converted to match the size of the tile area.

Figure 2:
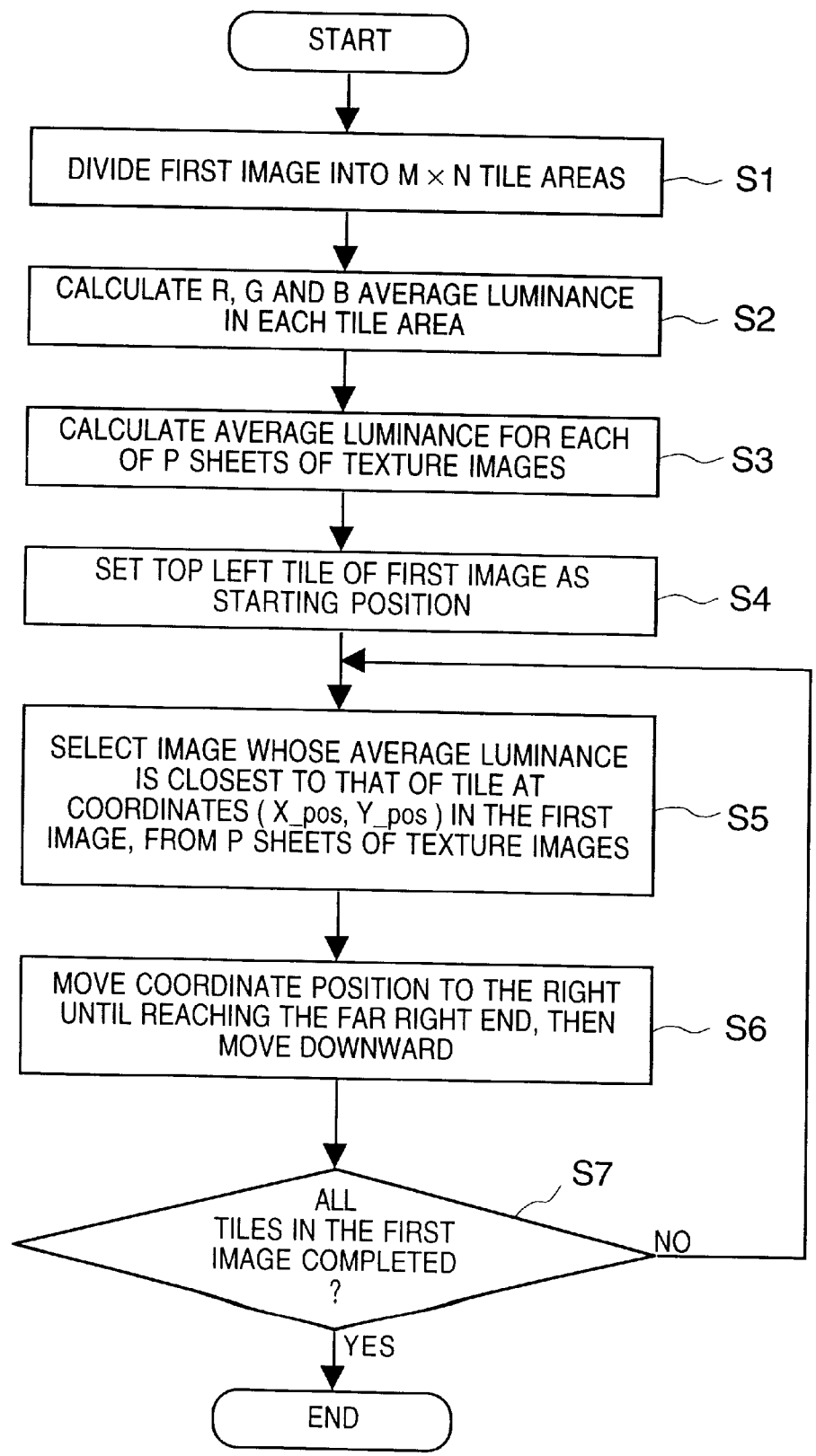
FIG. 2 is a flowchart showing a general producing process of a mosaic image.

FIG. 2 is a flowchart showing a general producing process of a mosaic image.

Figure 3:
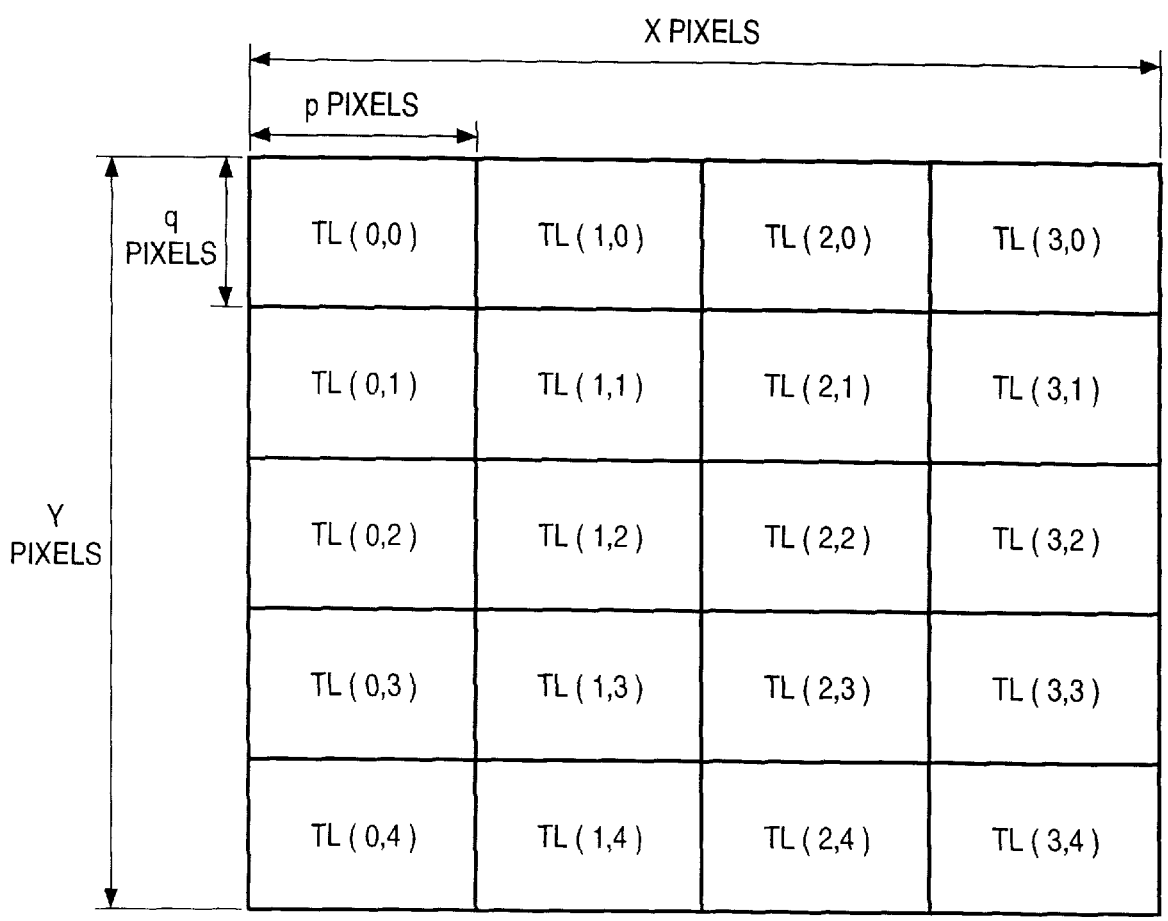
FIG. 3 is an explanatory view showing an example of an original image divided into M x N tile areas (divided areas)
Figure 13:
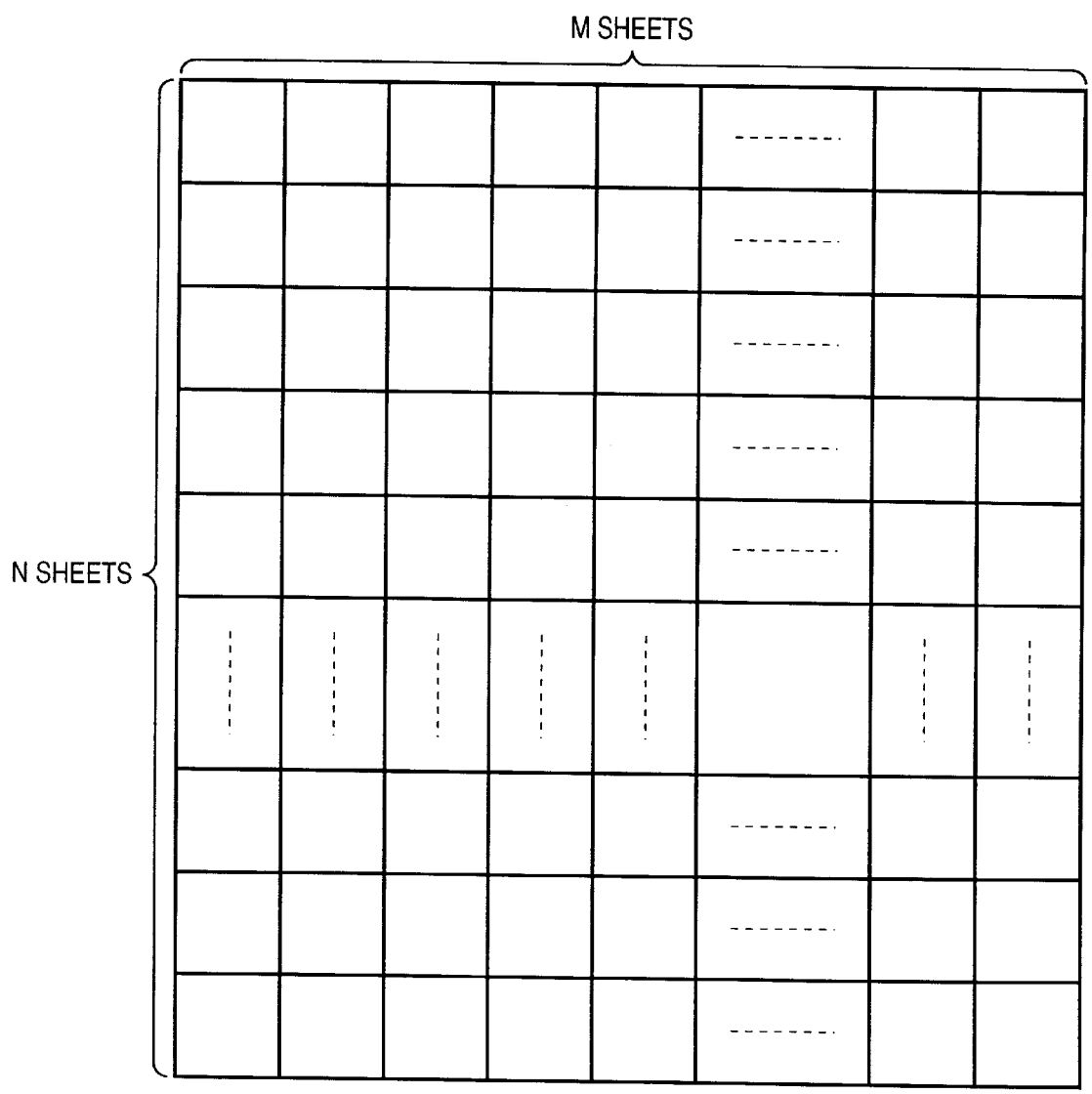
FIG. 13 is an explanatory view of a mosaic image.

In step S1 in FIG. 2, the first image 201 is divided into M×N tile areas. As a result, the first image 201 is divided into M×N rectangular tile areas as shown in FIG. 13. FIG. 3 shows a division example where M=4 and N=5.

Referring to FIG. 3, reference letters X and Y respectively denote the number of pixels of the first image 201 in the horizontal and vertical directions. Reference letters p and q respectively denote the number of pixels of each tile area in the horizontal and vertical directions, in a case where the first image 201 is divided into M×N rectangular tile areas TL(0, 0), TL(1, 0), TL(2, 0), . . . , TL(2, 4), and TL(3, 4). Therefore, the relations of X=p×M and Y=q×N stand.

Figure 4:
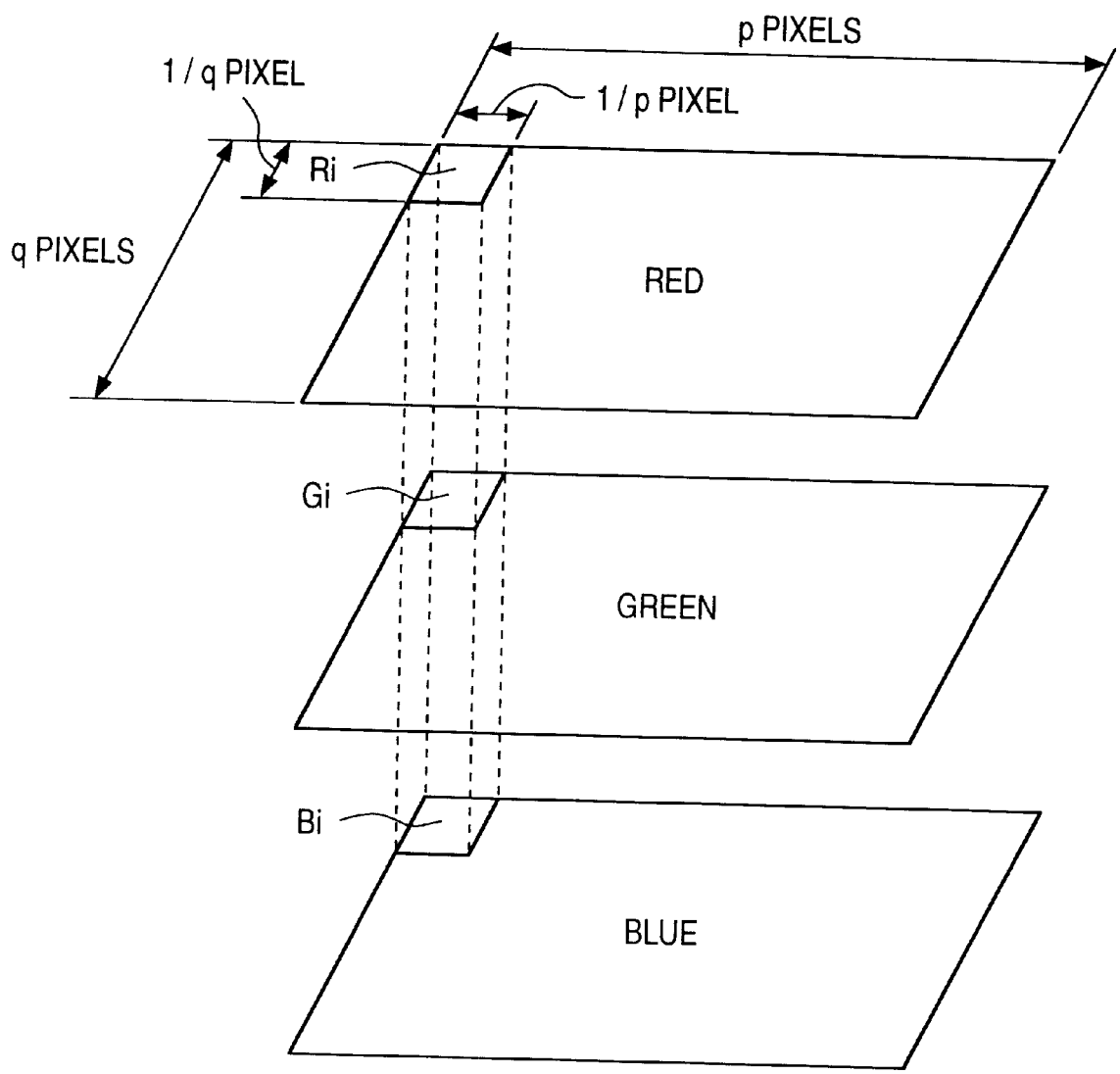
FIG. 4 is an explanatory view of a color structure in each of the tile areas which constitute a mosaic image.

FIG. 4 shows the structure of the three primary colors in each tile area. Each tile area consists of p×q pixels, and can be separated into three primary colors: red (R), green (G), and blue (B). These R, G and B components are referred to as Ri, Gi, and Bi.

After the first image 201 is divided into a plurality of areas in step S1 in FIG. 2, the control proceeds to step S2 where an average luminance (pixel value) for each of R, G and B is calculated with respect to each of the M×N tile areas by the following equation. In the following equation, the suffix "d_av" of the respective left members R, G and B indicates a luminance average of the "destination" tile area.

$$Rd\_av = \sum_{i=0}^{pq-1} Ri' / (pxq) \quad (1)$$

$$Gd\_av = \sum_{i=0}^{pq-1} Gi' / (pxq) \quad (2)$$

$$Bd\_av = \sum_{i=0}^{pq-1} Bi' / (pxq) \quad (3)$$

Next, the control proceeds to step S3 where an average luminance for each of R, G and B is calculated with respect to each of the P sheets of texture images 203, by the following equation. The suffix "s_av" of the respective left members R, G and B indicates an average luminance of the "source" texture image 203.

$$R_{s\_av} = \sum_{i=0}^{pq-1} Ri / (pxq) \quad (4)$$

$$G_{s\_av} = \sum_{i=0}^{pq-1} Gi / (pxq) \quad (5)$$

$$B_{s\_av} = \sum_{i=0}^{pq-1} Bi / (pxq) \quad (6)$$

Next, the control proceeds to step S4 where the counters X_pos (0≦X_pos≦M−1) and Y_pos (0≦Y_pos≦N−1), indicating the position of the tile area subjected to processing, are both initialized to 0. Note that (X_pos, Y_pos)=(0, 0) indicates the top left end tile area (TL(0, 0)) of the first image 201.

The control proceeds to step S5 where a most optimum texture image for the tile area, designated by the position counter X_pos and Y_pos, is selected from the texture image. The selection is made by calculating the sum of squares (ΔE) of an error in the R, G and B tristimulus values and selecting one having the minimum ΔE. The evaluation equation is shown below.

$$\Delta E = (R_{s\_av} - R_{d\_av})^2 + (G_{s\_av} - G_{d\_av})^2 + (B_{s\_av} - B_{d\_av})^2 \quad (7)$$

When pasting the selected texture image 203 on the corresponding tile area, if the size of the texture image does not match the size of the tile area, size changing process is performed so that the size of the selected texture image matches the size of the tile area.

The above process is sequentially performed for each tile area in the horizontal and vertical directions, and steps S5 to S7 are repeated until the process for the entire tile areas of the first image 201 is completed.

By the foregoing process, R, G and B components of each texture image are extracted for each tile area, and a texture image having the minimum luminance difference (error) for each color (stimulus value) is pasted on the tile to construct a mosaic image.

Even if a texture image having a similar luminance with respect to each stimulus value is selected as described above, there is a case where a generated mosaic image is not optimum. This is caused by problems such as inconsistent color differences between the tile areas of the first image 201 and selected texture images, or a roughly expressed halftone area, or different color tones in skin colors and so forth by using a texture image.

First Embodiment

Hereinafter, the generation process of a mosaic image according to the first embodiment of the present invention is described with reference to the accompanying drawings.

Figure 5:
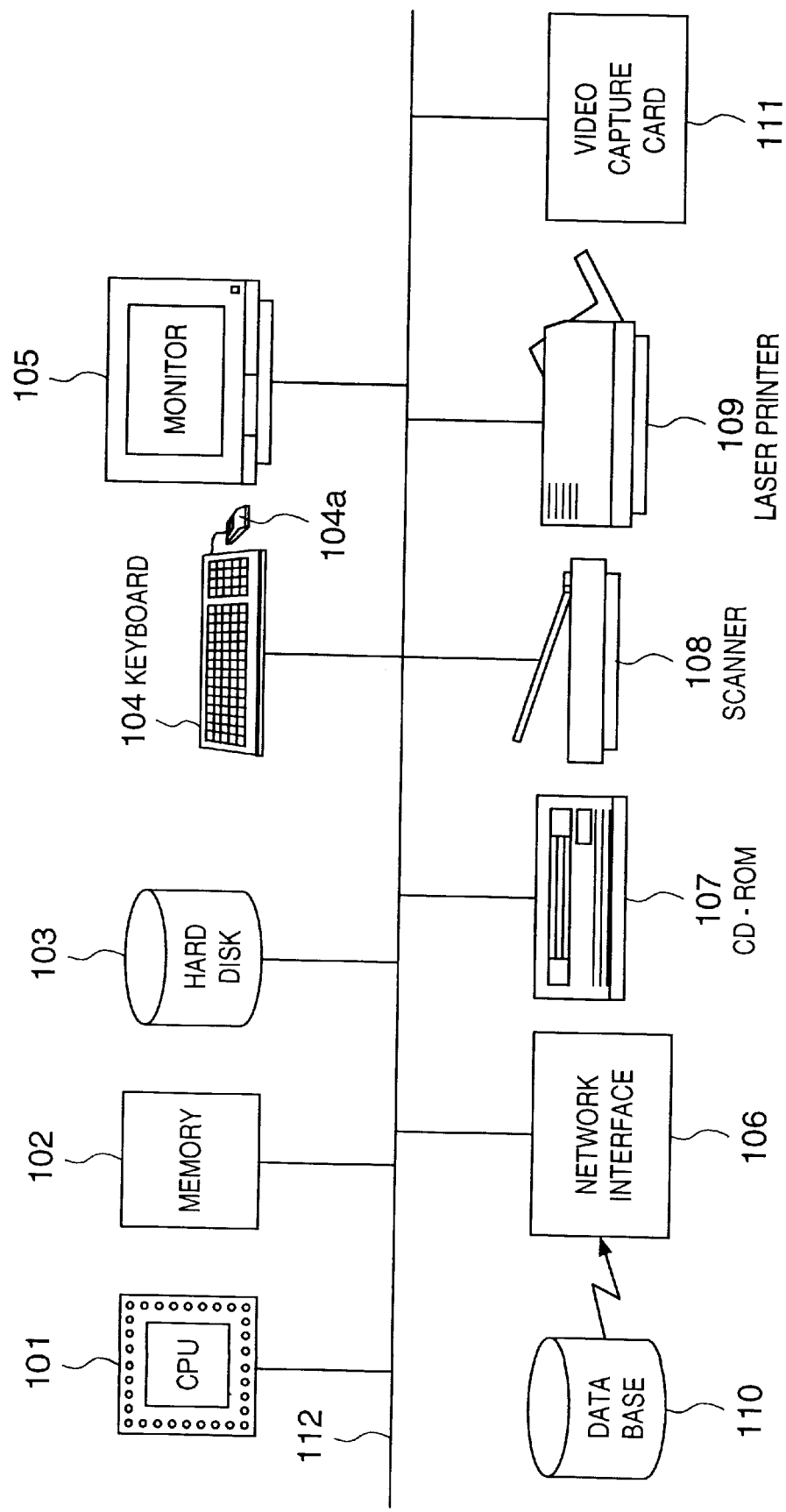
FIG. 5 is a block diagram showing a construction of an image processing apparatus according to a first embodiment of the present invention.

FIG. 5 is a block diagram showing a construction of an image processing apparatus according to a first embodiment of the present invention. In FIG. 5, reference numeral 101 denotes a CPU which controls operation of units to be described later, which are connected by bus 112. Reference numeral 102 denotes a memory for storing control programs executed by the CPU 101, or temporarily storing image data, e.g., the aforementioned first image 201 or texture images 203, or serving as a work area for storing various data at the time of CPU 101 operation. Reference numeral 103 denotes a hard disk for storing image data, e.g., the aforementioned first image 201 or texture images 203, control programs executed by the CPU 101 and so on. Reference numerals 104 and 104a denote a keyboard and mouse respectively, which are used by an operator when various commands and data are inputted. Reference numeral 105 denotes a monitor (display unit) where an inputted first image 201 or a generated mosaic image or a message to an operator are displayed. Reference numeral 106 denotes a network interface for obtaining various image data from a database 110 through a communication line. Reference numeral 107 denotes a CD-ROM where various data such as the first image or texture images or the like are stored. Reference numeral 108 denotes a scanner for reading an original document or a photograph image or the like. Reference numeral 109 denotes a printer, such as a color ink-jet printer or a color electrophotographic printer. Reference numeral 111 denotes a video capture card. Reference numeral 112 denotes a bus connecting each of these units. Note that all of these components are not required, thus for instance, the units 106 to 111 do not have to be included.

Image data or execution modules of software which realize the process according to the present embodiment are loaded from the hard disk 103 to the memory 102. The first image 201 and texture images 203 may be recorded in the CD-ROM 107 in advance. As a format of image data recorded in the CD-ROM 107, Photo CD, FlashPix, JFIF and so forth are known.

Image data may be inputted through the scanner 108 or video capture 111 if necessary.

Figure 6:
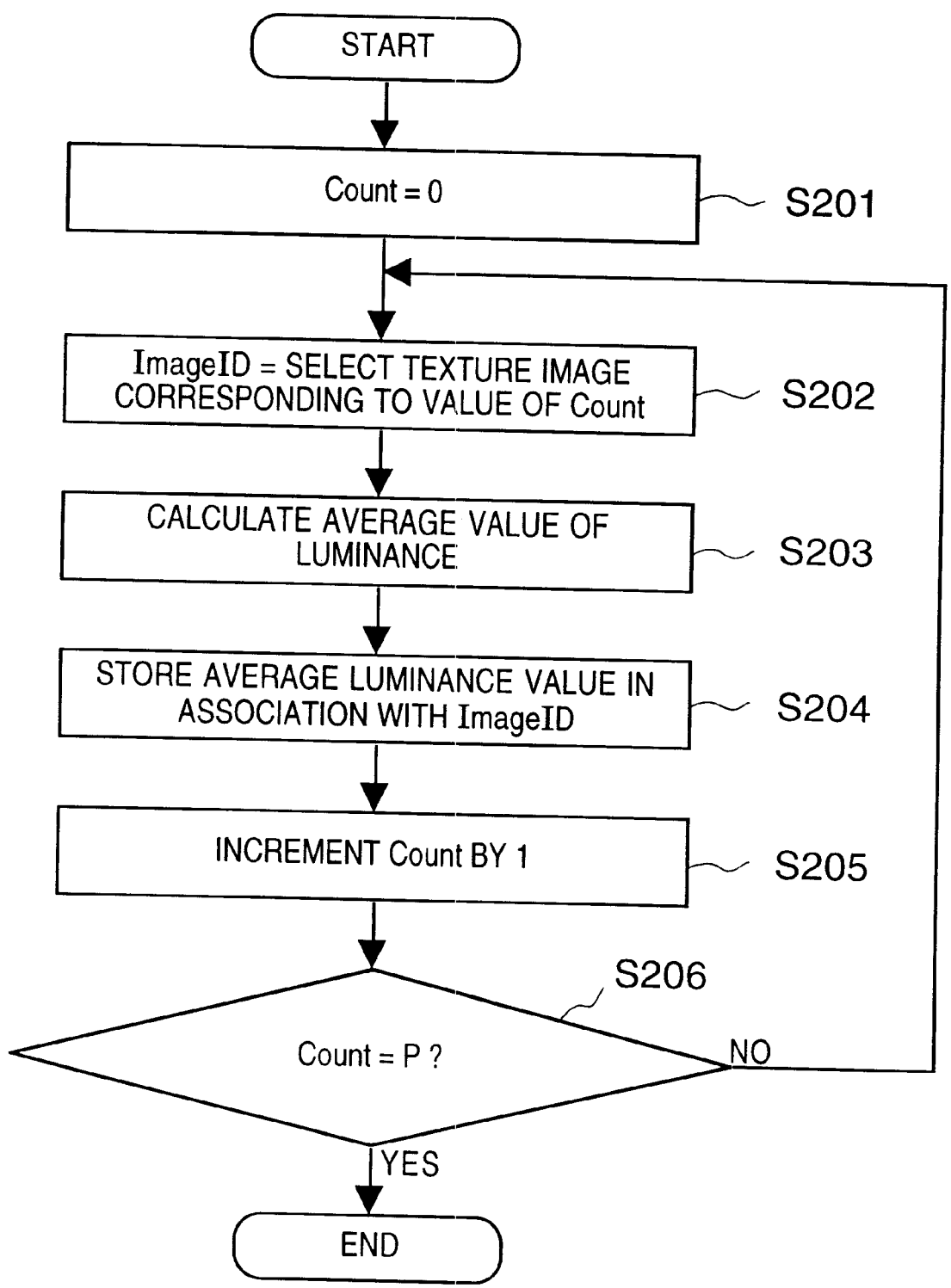
FIG. 6 is a flowchart showing a calculation process of a luminance average of each of plural texture images according to the first embodiment.

FIG. 6 is a flowchart showing a calculation process of a luminance average of each of plural sheets of texture images according to the first embodiment of the present invention. The program which executes this process is stored in the memory 102, and executed under the control of the CPU 101.

In step S201, a counter variable "Count" which controls the number of times of processing is initialized to 0. The variable Count is set in the work area of the memory 102. In step S202, a texture image (ImageID=i), having an identification number (ImageID) same as the value of the variable (Count=i), is selected from a plurality of texture images stored in, e.g., hard disk 103, and the image data is read out of the hard disk 103. Note that the texture image selected herein is not limited to the texture image having the identification number (ImageID) same as the value of the variable Count, but may be a texture image which corresponds to the variable Count on a one-to-one basis. Note that the texture images 203 may be stored in the hard disk 103, but may be read from e.g., CD-ROM 107 or scanner 108.

In step S203, an average luminance of each texture image is calculated. The process in step S203 is now described in detail with reference to the flowchart in FIG. 7.

Figure 7:
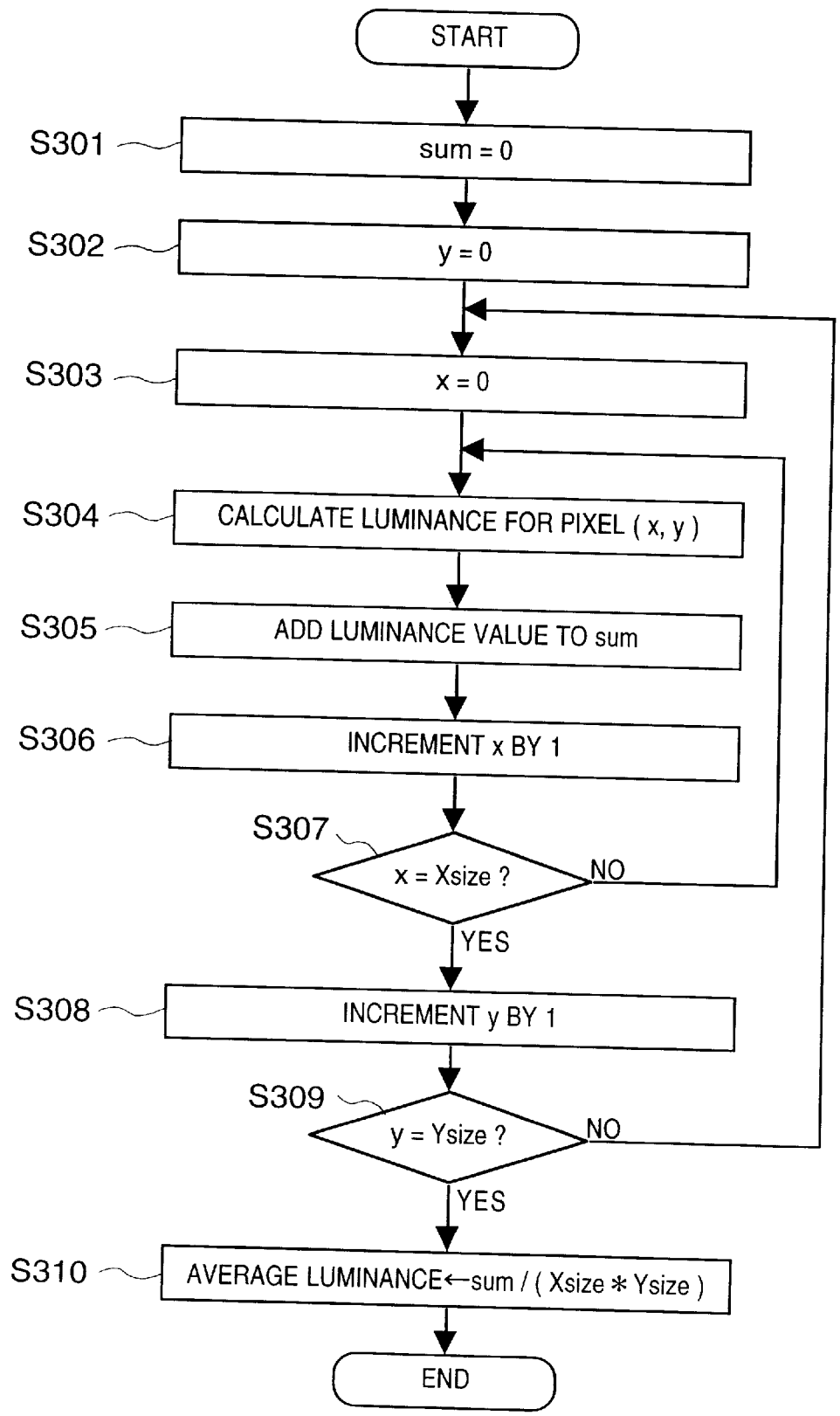
FIG. 7 is a flowchart showing a calculation process of an average luminance of one of the texture images, performed in step S203 in FIG. 6.

FIG. 7 is a flowchart showing the calculation process of average luminance for a texture image 203, performed in step S203 in FIG. 6.

First in step S301, the variable "sum" (set in the memory 102), which holds the total value of luminance, is initialized to 0. In steps S302 and S303, variables y and x (set in the memory 102), respectively indicating pixel positions in the vertical and horizontal directions of the texture image 203, are initialized to 0. In step S304, based on R, G and B data of a pixel designated by the variable (x, y), luminance Y(x, y) of the pixel is calculated according to the following equation (8).

$$Y(x, y) = 0.3R + 0.59G + 0.11B \qquad (8)$$

The luminance Y(x, y) given by equation (8) is an isochromaticity expressed in additive mixture of color stimuli in photic stimuli of R, G and B, assuming a case where each wavelength of R, G and B is constant.

In step S305, the luminance Y calculated in step S304 is added to the variable sum, and a cumulative addition value is obtained. In step S306, the variable x indicating a pixel position in the direction x is incremented by 1. In step S307, it is determined whether or not the value of the variable x is equal to the number of pixels Xsize ("p" in the aforementioned example) in the horizontal direction of the texture image 203. If not, the control returns to step S304 for calculating luminance of the next pixel, then the calculated result is added in step S305. This process is repeated until the variable x becomes equal to the number of pixels (p) in the horizontal direction.

When the value of the variable x becomes equal to the number of pixels Xsize in the horizontal direction, the control proceeds to step S308 where the value of the variable y indicating a pixel position in the vertical direction is incremented by 1. In step S309, it is determined whether or not the value of the variable y is equal to the number of pixels Ysize (q in the aforementioned example) in the vertical direction of the texture image 203. If not, the control returns to step S303 for initializing the value of the variable x to 0, then the above-described process is repeated. When the value of the variable y becomes equal to the number of pixels Ysize (q) in the vertical direction of the texture image 203 in step S309, the control proceeds to step S310. Then, the cumulative addition value "sum" of the luminance Y is divided by the number of pixels (Xsize x Ysize) of the texture image to obtain an average luminance value per pixel. In this manner, an average luminance value per pixel in the texture image 203 is calculated.

Note that an average luminance value of a texture image may be calculated in advance for each texture image and stored in association with each texture image. This also applies to the following embodiments.

After the luminance average value of each texture image 203 is obtained in the foregoing manner, the control returns to step S204 in FIG. 6. In step S204, the average luminance value of the texture image 203, obtained in step S203, is stored in the memory 102 in association with an identification number (ImageID) of the texture image. In step S205, the value of the aforementioned variable Count is incremented by 1. In step S206, it is determined whether or not the value of the variable Count is equal to the number of sheets (P) of the texture images 203. If not, the control returns to step S202 for repeating the above-described process. When the value of the variable Count becomes equal to the number of sheets P of the texture images 203, this control ends.

An average luminance value per pixel in each of the texture images is calculated by the above-described process.

Figure 8:
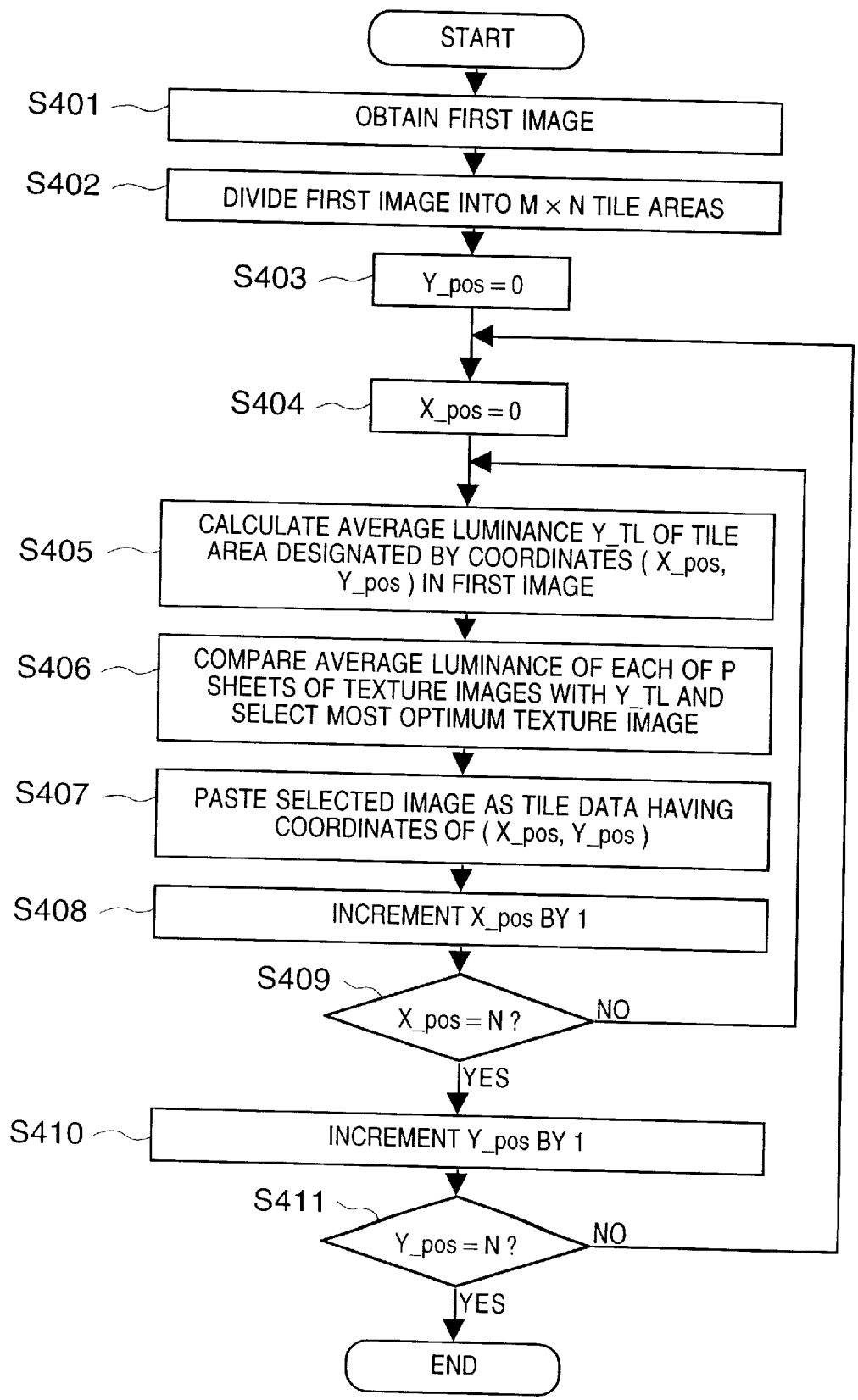
FIG. 8 is a flowchart showing a generation process of a mosaic image according to the first embodiment.

FIG. 8 is a flowchart describing a generation process of a mosaic image according to the first embodiment of the present invention. The control program which executes this process is stored in the memory 102, and executed under the control of the CPU 101.

In step S401, the first image 201 serving as an original image of a mosaic image, is obtained. The first image 201 may be stored in the hard disk 103 or recorded in the CD-ROM 107, or may be obtained from the database 110 via network. Alternatively, an image inputted by the scanner 108, video capture card 111, or a digital camera (not shown) or the like may be used.

In order to obtain the first image 201, a plurality of candidate images are read from aforementioned storage media and displayed on the display unit 105. Then, an operator selects a desired image by using the keyboard 104 or mouse 104a or the like. Note that the images displayed on the display unit 105 may be displayed in a reduced form, depending on the stored image size. As a format of such image data, Photo CD, FlashPix, JPEG and so forth are known.

After a desired first image 201 is selected, the control proceeds to step S402 where the first image 201 is divided into M×N areas. As a result, M×N rectangular tiles TL(0, 0), TL(0, 1), TL(0, 2), . . . , TL(4, 2), TL(4, 3), . . . , TL(M, N) are generated (see FIGS. 3 and 13). FIG. 3 shows a case where the first image 201 is divided into 4×5 rectangular areas.

In steps S403 and S404, the position variables X_pos and Y_pos, indicating the position of the subject tile area, are initialized to 0. In step S405, average luminance Y_TL of the tile area, whose position is designated by the variables X_pos and Y_pos, is calculated. The method of calculating the average luminance is realized by executing the flowchart in FIG. 7 on the tile area instead of the texture image 203. In this case, values of the variables Xsize and Ysize are respectively (X/M) and (Y/N), that is, p and q in the example shown in FIG. 3.

In step S406, the average luminance Y_TL of the tile area calculated in step S405 is compared with the average luminance of each of the P sheets of texture images 203 stored according to the above-described flowchart in FIG. 6.

The comparison process of the average luminance is described in detail with reference to the flowchart in FIG. 9.

Figure 9:
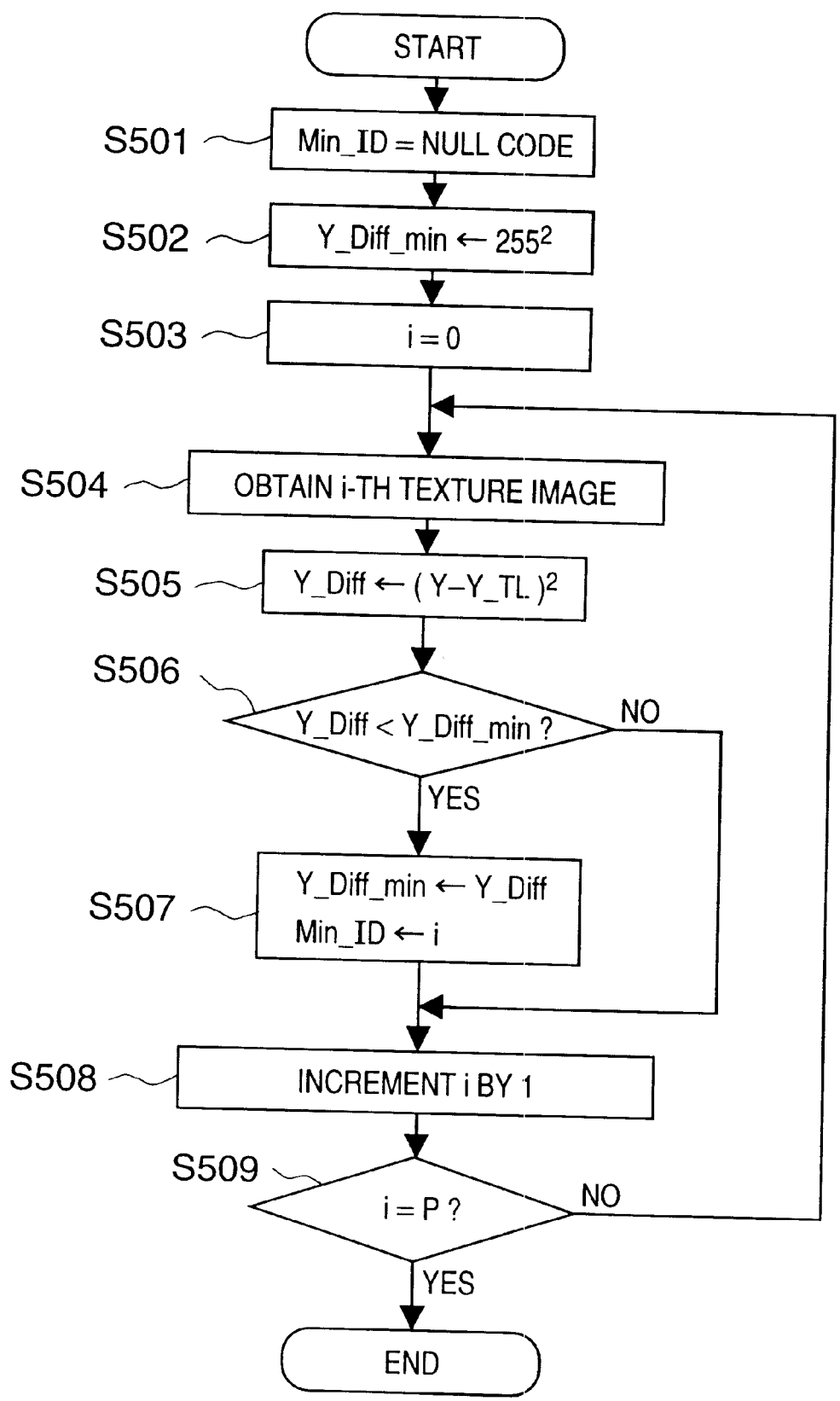
FIG. 9 is a flowchart showing a selection process of a texture image, which is closest to an image of a divided tile area, performed in step S406 in FIG. 8.

In step S501 in FIG. 9, a variable Min_ID indicative of a texture image having the minimum value of the average luminance difference is initialized to "null code (null)". In step S502, a variable Y_Diff_min indicative of the minimum value of the average luminance difference is set in a square of 255 (maximum value possible). In step S503, a variable i (image ID), which controls the number of times of repetition and designates a texture image to be compared, is initialized to 0.

In step S504, the texture image 203 having an identification number (ImageID) which matches the variable i is read out of the memory 102. In step S505, a square (Y_Diff) of a difference between the average luminance Y of the texture image and the average luminance (Y_TL) of the subject tile area obtained in step S405 is calculated. Although the square of the difference is calculated herein, a mean square may be calculated.

In step S506, the difference (Y_Diff) obtained in step S505 is compared with the minimum value (Y_Diff_min). If the difference (Y_Diff) is smaller than the minimum error (Y_Diff min), the control proceeds to step S507. In step S507, the difference (Y_Diff) is set in the minimum value (Y_Diff_min), and the variable (Min_ID) indicative of a texture image having a minimum difference is updated by the variable i (the identification number (Image ID)) of the texture image. In step S508, the variable i, which designates a texture image 203 subjected to comparison, is incremented by 1. In step S509, it is determined whether or not the comparison process of average luminance is completed for all P sheets of texture images 203. If the process is not completed, the control returns to step S504 for executing the above-described process.

By the foregoing process, a texture image having a minimum average luminance difference with respect to a subject tile area is specified.

After determining a most optimum texture image for the subject tile area in the foregoing manner, the control proceeds to step S407 in FIG. 8. In step S407, an identification number (ImageID) of the selected texture image is stored in the memory 102 in association with the subject tile area. By this, the corresponding texture image 203 is pasted on the tile area. Next, in step S408, the position variable X_pos, which designates the position of a tile area to be processed, is incremented by 1. In step S409, it is determined whether or not the value of the position variable X_pos has reached the horizontal maximum value M ("4" in the aforementioned example). If not, the control returns to step S405 for repeating the above-described process.

If it is determined in step S409 that the process has been completed for M number of tile areas in the horizontal direction, the control proceeds to step S410 where the position variable Y_pos in the vertical direction is incremented by 1. In step S411, it is determined whether or not the value of the position variable Y_pos has reached the vertical maximum value N ("5" in the aforementioned example). If not, the control returns to step S404 for repeating the above-described process. If the value of the position variable Y_pos has reached the maximum value N, this control ends.

In the above-described process, the texture image 203 having a minimum average luminance value is selected and pasted on each tile area of the first image 201, and a mosaic image can be generated.

Second Embodiment

In the second embodiment, instead of comparing luminance values of the R, G and B color space as described in the first embodiment, association is established between each tile area of the first image 201 and texture image 203 by using parameters described by a uniform color perception space (L*a*b*). More specifically, the process in step S304 in FIG. 7 where the average luminance value is calculated is substituted by the following equation. The following equation bases upon the L*a*b* standard colorimetric system. Note that L* represents psychometric lightness, and a* and b* represent perceptive chromaticity. The psychometric lightness and perceptive chromaticity are obtained by the following equation, using tristimulus values X, Y and Z in the X-Y-Z standard calorimetric system of an object color.

$$(L^* \text{ when } Y/Y0 > 0.008856) \; L^* = 116(Y/Y0)^{1/3} - 16 \qquad (9a)$$

$$(L^* \text{ when } Y/Y0 \leq 0.008856) \; L^* = 903.3(Y/Y0) \qquad (9b)$$

$$a^* = 500((X/X0)^{1/3} - (Y/Y0)^{1/3}) \qquad (10)$$

$$b^* = 200((Y/Y0)^{1/3} - (Z/Z0)^{1/3}) \qquad (11)$$

Note that X0, Y0 and Z0 are tristimulus values of a standard light source used in illumination or standard light.

Herein, X, Y and Z can be obtained by the following equation (12) which is an expansion of a matrix, based on R, G and B values. Note that the coefficient $a_{i,j}$ is a parameter changed in accordance with the processing of R, G and B data by an image input apparatus inputting the image data.

$$X = a11R + a12G + a13B \; Y = a21R + a22G + a23B \; Z = a31R + a32G + a33B \qquad (12)$$

By the foregoing equations (9a), (9b) and (10)–(12), the psychometric lightness L* and perceptive chromaticity a* and b* of each texture image 203 and tile areas are calculated.

This process can be realized by substituting the luminance average calculation process in the flowchart in FIG. 7 described in the first embodiment with a process of calculating the L*, a*, and b*. Association establishment between each tile area and texture image is realized based on the color difference ΔE_Lab expressed in equation (13).

$$\Delta E\_Lab = \{(\Delta L^*)^2 + (\Delta a^*)^2 + (\Delta b^*)^2\}^{1/2} \qquad (13)$$

More specifically, in the flowcharts in FIGS. 8 and 9 described in the foregoing first embodiment, the selection process of a texture image having a minimum average luminance error is replaced with the process of selecting a texture image 203 having a minimum error (ΔL*, Δa*, Δb*) for each of the parameters L*, a* and b*, and pasting the selected texture image 203 on the subject tile area. By this process, a mosaic image generation process based on the L*a*b* standard calorimetric system is realized.

As described above, according to the second embodiment, by using parameters (psychometric lightness and perceptive chromaticity) of the L*a*b* standard calorimetric system for the process of comparing and associating each tile area of the first image 201 with each of the texture images 203, it is possible to designate a texture image based on a uniform color perception expression, and a mosaic image which is more natural to human eyes can be produced.

Third Embodiment

In the third embodiment, whether to employ the luminance average value according to the first embodiment or the L*a*b* standard calorimetric system F according to the second embodiment is determined in accordance with whether a producing mosaic image is a color image or a monochrome image.

Figure 10:
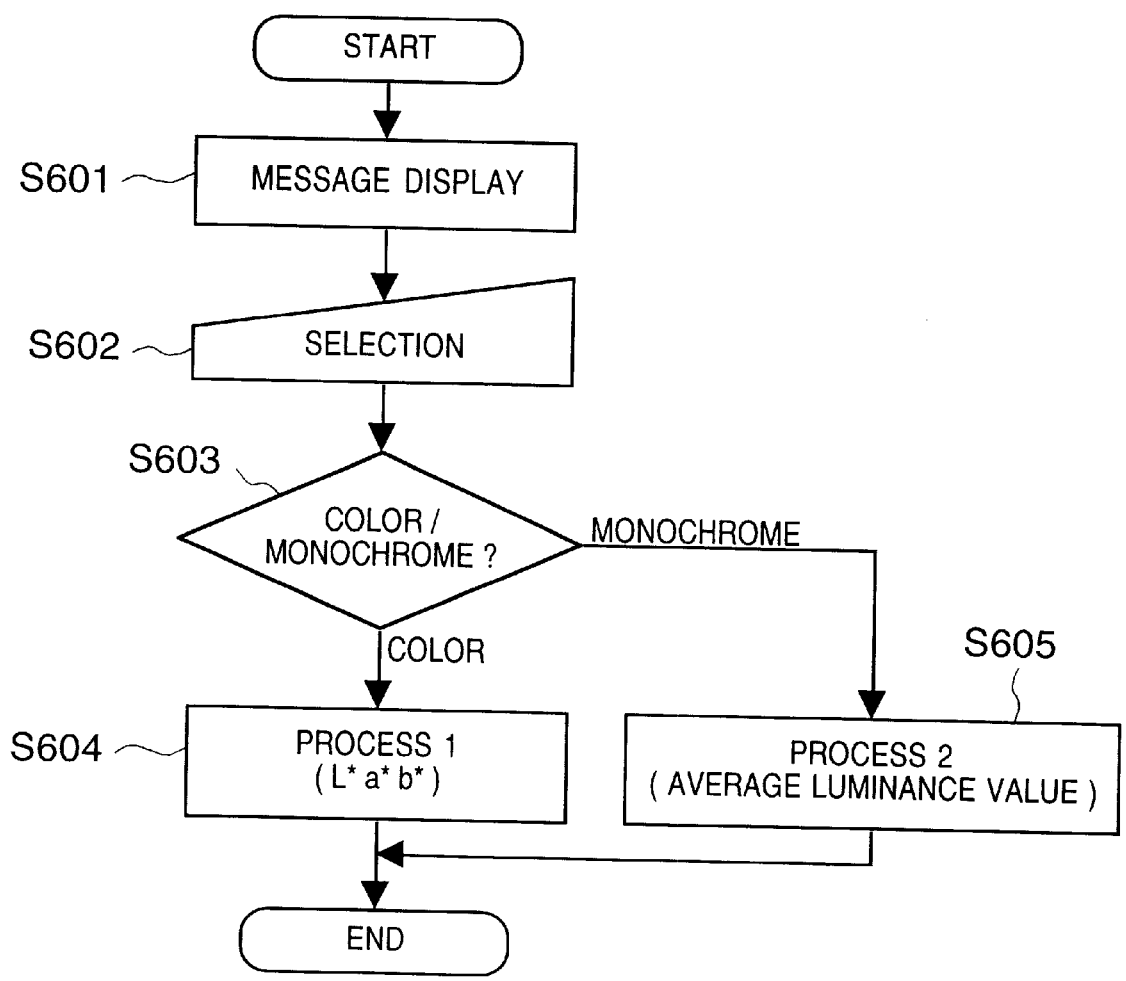
FIG. 10 is a flowchart showing the process according to the third embodiment.

FIG. 10 is a flowchart showing the process according to the third embodiment. The program which executes the process is stored in the memory 102.

In step S601 in FIG. 10, in a case of printing a produced mosaic image by the printer 109, a message inquiring whether the mosaic image is to be printed in color or monochrome is displayed in the display unit 105. In step S602, an operator who reads the displayed message selects a desired print mode: color or monochrome, by using the keyboard 104 or mouse 104a. In step S603, the process in step S604 is performed if the selected print mode is color printing, while the process in step S605 is performed if the selected print mode is monochrome printing.

The process in step S604 uses the method described in the second embodiment, which employs the standard calorimetric system based upon the L*a*b* space as an evaluation reference so as to produce the mosaic image. The process in step S605 uses an average luminance value for each of R, G and B as described in the first embodiment so as to produce the mosaic image.

According to the third embodiment, an attribute (color or monochrome) of an output (printed) image is inquired in advance and a processing method is changed in accordance with the selected type of the output image. Therefore, a mosaic image which is most optimum to the attribute of the output image can be produced.

Figure 11:
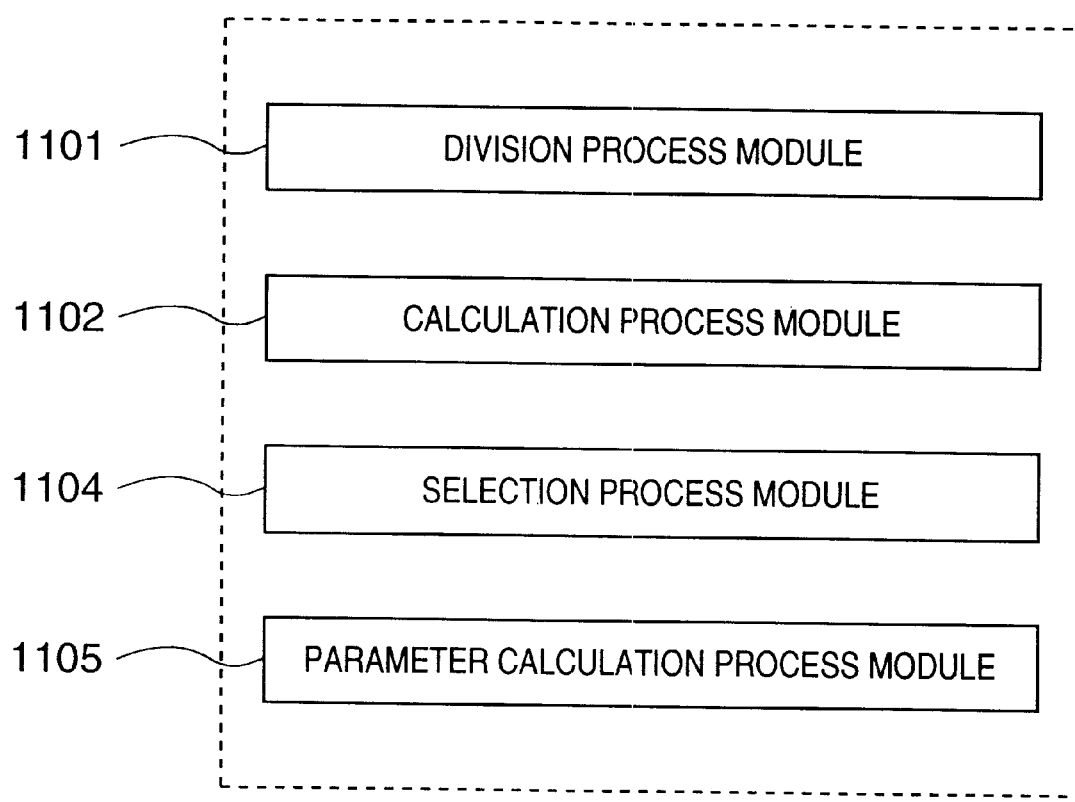
FIG. 11 shows a memory map of a recording medium storing process programs according to the first to third embodiments of the present invention.

In a case where the program which executes the above-described process is applied to a storage medium, the storage medium stores program codes corresponding to the flowcharts described in the foregoing embodiments. Briefly, the storage medium stores each module shown as an example of a memory map in FIG. 11.

More specifically, program codes which correspond to "division process module 1101", "calculation process module 1102", "selection process module 1104" and "parameter calculation process module 1105" are stored in the storage medium.

Note that in the following embodiments, modules corresponding to each process are similarly stored in the storage medium, realizing the storage medium according to the present invention. Drawings and description thereof will not be provided in the following embodiments.

Fourth Embodiment

Figure 12:
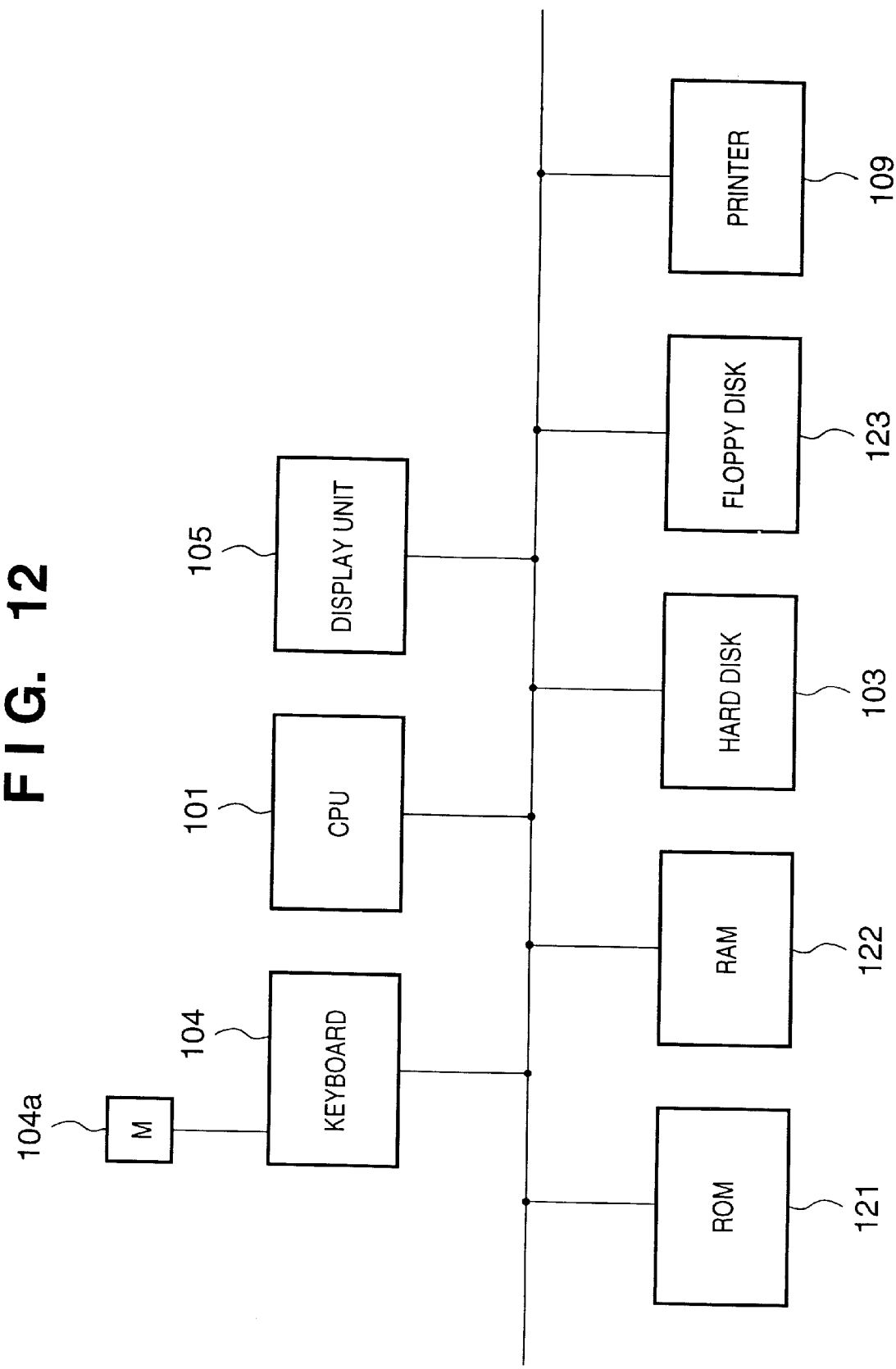
FIG. 12 is a block diagram showing a construction of an image processing apparatus according to a fourth embodiment of the present invention.

FIG. 12 is a block diagram showing a construction of an image processing apparatus according to a fourth embodiment of the present invention. With regard to the components common to those of the first embodiment in FIG. 5, the same reference numerals are assigned.

Referring to FIG. 12, reference numeral 101 denotes a CPU, which controls the entire system according to a program loaded from the hard disk 103 to a RAM 122. The keyboard 104 and mouse 104a are used for inputting various commands and data to the system according to the present embodiment. Reference numeral 105 denotes a display unit comprising, e.g., a CRT or liquid crystal or the like. Reference numeral 121 denotes ROM and numeral 122 denotes RAM, which construct a storage unit of the system according to the present embodiment, and store programs executed by the system or data used by the system. Reference numeral 123 denotes a floppy disk device serving as an external storage device used in a file system of the present system. Reference numeral 109 denotes a printer.

In the hard disk 103, a plurality (P) of texture images 203 which become components of a mosaic image are stored. M×N sheets of images, selected from the texture images 203 according to a program which will be described later, are arranged as shown in FIGS. 1 and 13, M sheets in the horizontal direction and N sheets in the vertical direction, to form a mosaic image. A mosaic image formed in this manner is stored as an image file in the hard disk 103, or displayed in the display unit 105, or printed by the printer 109.

Figure 14:
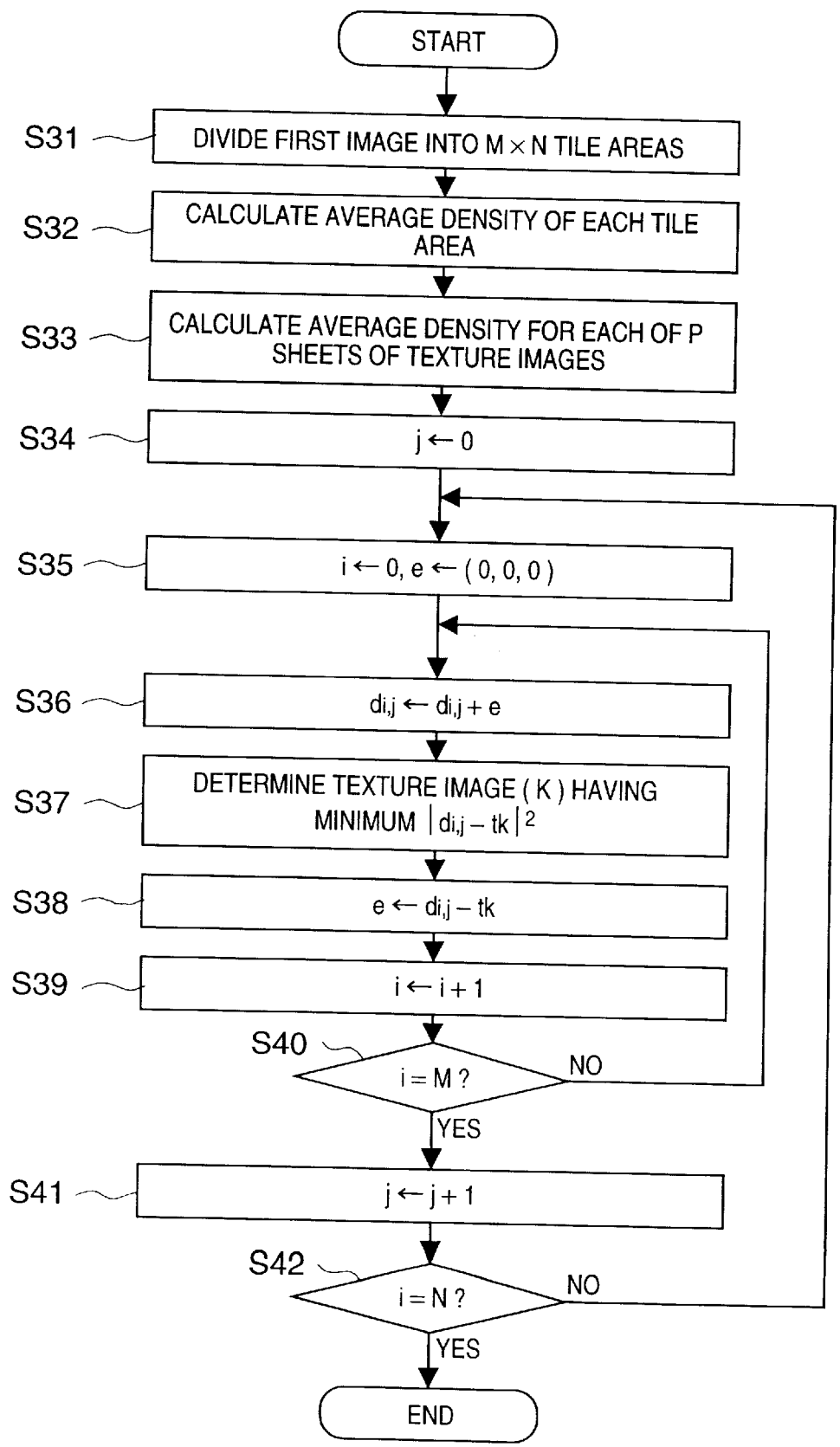
FIG. 14 is a flowchart showing a producing process of a mosaic image in the image processing apparatus of the fourth embodiment.
Figure 15:
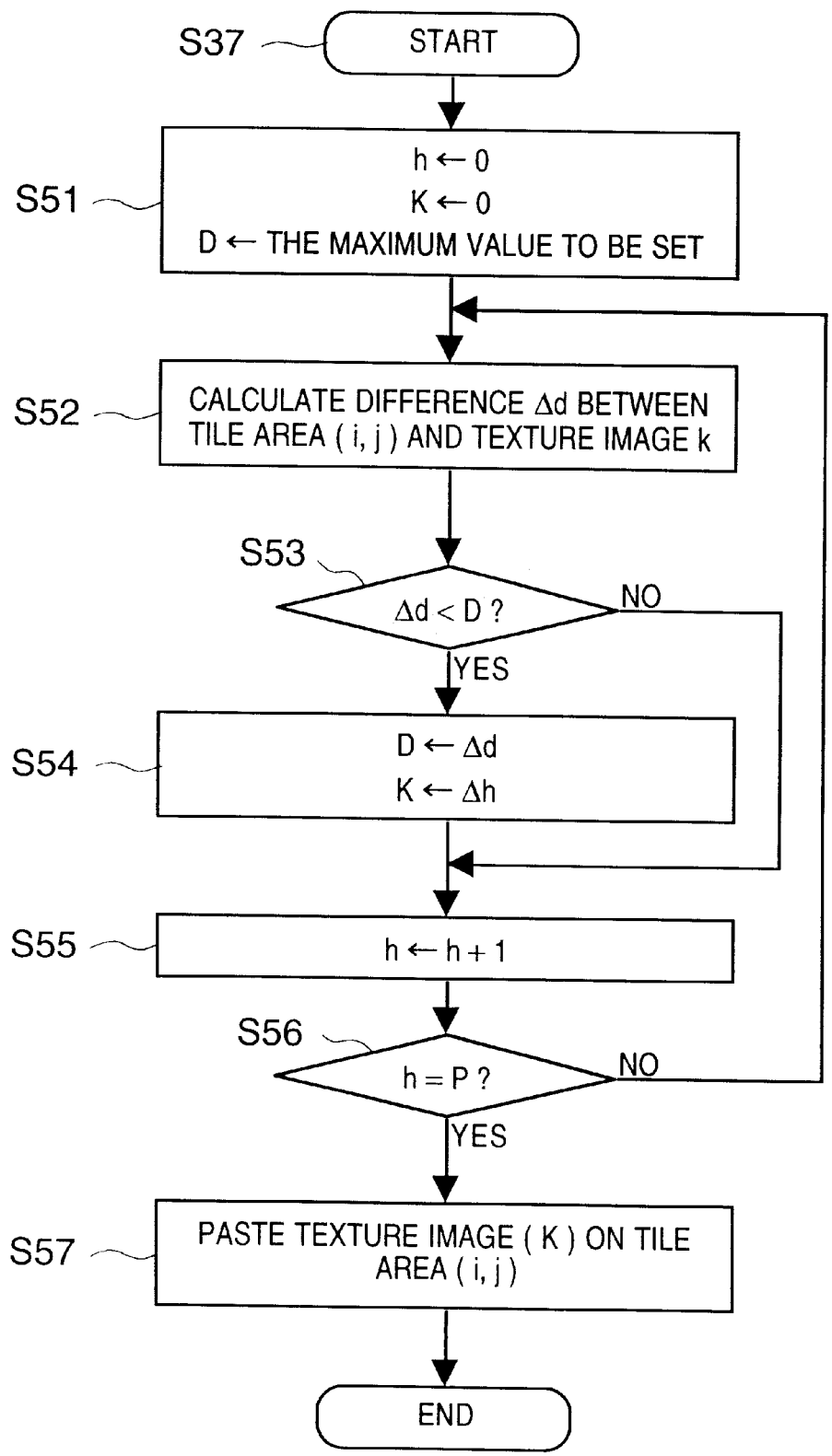
FIG. 15 is a flowchart showing a determination process of a texture image in step S37 in FIG. 14.

Description will be provided with reference to FIGS. 14 and 15 for selecting appropriate M×N sheets of images from the P sheets of texture images 203 and producing a mosaic image 202 based on the first image 201.

FIG. 14 is a flowchart showing a generation process of a mosaic image in the image processing apparatus of the fourth embodiment. The program which executes this process is stored in the hard disk 103, and executed by being loaded to the RAM 122.

In step S31, the first image 201 is divided into M×N areas (tile area). As a result, M×N tile areas TL(0, 0), TL(0, 1), . . . , TL(M−1, N−1) are generated (see FIGS. 3 and 13).

In step S32, average density $d_{i,j}$ indicating each of R, G and B average density (pixel value) is calculated with respect to each of the M×N tile areas by the following equation. Herein, $d_{i,j}$ is a two dimensional-array of a three dimensional vector, and is expressed by $d_{i,j}=(R_{i,j}, G_{i,j}, B_{i,j})$.

$$d_{i,j}=(\Sigma R/p \cdot q, \Sigma G/p \cdot q, \Sigma B/p \cdot q) \qquad (14)$$

Herein, $\Sigma$ indicates the sum of color components of all pixels included in a tile area. Note that $0 \leq i \leq M-1$, $0 \leq j \leq N-1$ stands.

In step S33, average density tk for each of R, G and B is calculated with respect to each of the P sheets of texture images 203. This is calculated by the following equation, assuming that the size of each texture image is p'×q' (pixels). $\Sigma$ indicates the sum of color components of all pixels included in a texture image.

$$tk=(\Sigma R/p' \cdot q', \Sigma G/p' \cdot q', \Sigma B/p' \cdot q') \text{ where } 0 \leq k \leq P-1 \qquad (15)$$

Note that the calculation process of average density in steps S32 and S33 is performed in the similar manner to that shown in the flowchart in FIG. 7.

Next, in steps S34 to S42, a most optimum texture image 203 to be pasted on a tile area is selected by employing a well-known technique of error diffusion method used in image binarization.

In step S34, a counter variable i in the horizontal direction is initialized to 0. In step S35, a counter variable j (set in the RAM 112) in the vertical direction is initialized to 0. At this stage, an error vector e (set in the RAM 112), which represents an accumulated error in the calculation performed so far with respect to tile areas, is initialized to (0, 0, 0). In step S36, the error vector e is added to the average density $d_{i,j}$ of the tile area (i, j).

$$d_{i,j} \leftarrow d_{i,j}+e$$

In step S37, a texture image k having density closest to the average density $d_{i,j}$ of the tile area is selected. The selection method will be described later in detail with reference to the flowchart in FIG. 15.

After a most optimum texture image 203 for the tile area is selected, the control proceeds to step S38 where an error vector e is calculated based on a difference between the average density $d_{i,j}$ of the tile area and the average density tk of the selected texture image 203.

$$e \leftarrow d_{i,j}-tk$$

The error vector e obtained in the foregoing manner is diffused to an area neighboring in the horizontal right of the subject tile area in the subsequent process (step S36).

In step S39, the counter variable i is incremented by 1. In step S40, the value of the variable i is compared with the value M (=4 in FIG. 3). If the variable i equals to value M, it is determined that the process for four tile areas in the horizontal direction has been completed. In step S41, the counter variable j in the vertical direction is incremented by 1 so as to advance in the vertical direction. In step S42, the value of the variable j is compared with the value N (=5 in FIG. 3). If the variable j equals to the value N, it is determined that the process for all M×N areas has been completed. If the variable j is not equal to the value N, the control returns to step S35 for performing process on the next area in the horizontal direction.

In step S40, if the value of the variable i is not equal to value M, the control returns to step S36 for performing process on the tile area in the horizontal right of the subject tile area.

Next, the selection process of the most optimum texture image 203 in step S37 in FIG. 14 is described with reference to the flowchart in FIG. 15.

Selection of Most Optimum Texture Image tk

FIG. 15 is a flowchart showing a determination process of one of the texture images 203 in step S37 in FIG. 14.

In step S51, counter variables h and K which count the sheets of the texture images 203 are initialized to 0, and a variable D is initialized to the maximum value to be set. In step S52, a difference Δd between the average density $d_{i,j}$ of the tile area (i, j) and the average density tk of the texture image k is calculated by the following equation.

$$\Delta d = \{|d_{i,j}R - tkR|^2\} + \{|d_{i,j}G - tkG|^2\} + \{|d_{i,j}B - tkB|^2\} \tag{16}$$

Note in equation (16), $d_{i,j}R - tkR$ indicates an error of R component, $d_{i,j}G - tkG$ indicates an error of G component, and $d_{i,j}B - tkB$ indicates an error of B component.

In step S53, the difference Δd is compared with the value of the variable D. If Δd<D stands, the control proceeds to step S54 where the difference Δd is set in the variable D, and the value of the counter h substitutes for the variable K indicative of a texture image. Accordingly, a value K indicative of a texture image having the minimum error Δd is determined in step S54.

Following the step S54 or if Δd<D does not stand in step S53, the control proceeds to step S55 where the counter h is incremented by 1. In step S56, the value of the counter h is compared with the number (P) of the texture images. If the counter h equals to the number P, it is determined that process for all the texture images has been completed and the control proceeds to step S57. If the counter h is not equal to the number P, the control returns to step S52 for repeating the aforementioned process.

In step S57, the texture image K which is to be pasted on the tile area (i, j) is determined, and the determined texture image 203 is pasted on the tile area (i, j).

Although the calculation of an average density difference between the tile area of the first image 201 and the texture image 203 is performed by using the square difference calculation in step S52 in FIG. 15, the present invention is not limited to this. The difference may be obtained by calculating a difference of absolute values ($|d_{i,j}R - tkR|$, $|d_{i,j}G - tkG|$, $|d_{i,j}B - tkB|$). In this case, the calculation precision is relatively deteriorated compared to the square difference calculation, but the process speed can be improved.

Furthermore, although the direction of diffusing the error e is specified as the right direction of the subject tile area, the present invention is not limited to this. By adopting various techniques us ed in general error diffusion methods, e.g., diffusing the error e such that a half of the error e is diffused to the right side of the subject tile area and the other half is diffused to the lower side of the subject tile area, it is possible to improve the quality of a mosaic image 202.

Fifth Embodiment

Next, a fifth embodiment of the present invention is described. The fifth embodiment is characterized in that even if a tile area includes an edge or the like, a corresponding texture image is generated. Note that since the construction of the image processing apparatus according to the fifth embodiment is identical to that of the first to fourth embodiments, description thereof will not be provided.

Figure 16:
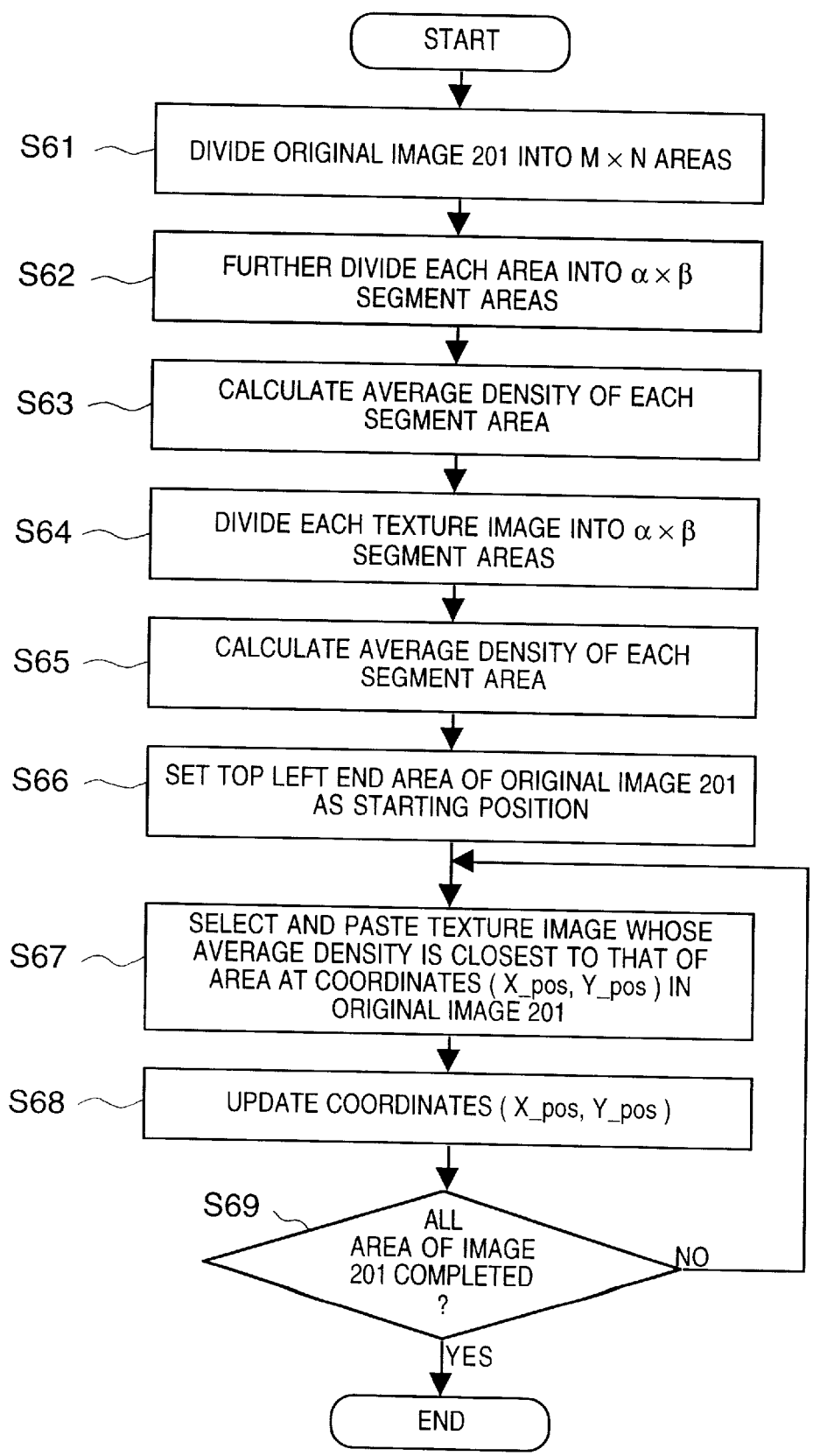
FIG. 16 is a flowchart showing a producing process of a mosaic image in an image processing apparatus of a fifth embodiment.

FIG. 16 is a flowchart showing a producing process of a mosaic image according to the fifth embodiment. Optimum M×N sheets of images are selected from P sheets of texture images 203 and a mosaic image 202 based on the first image 201 is produced. The program which realizes this process is stored in the hard disk 103, and executed by being loaded to the RAM 122.

In step S61, the first image 201 is divided into M×N areas (tile areas). As a result, M×N rectangular areas TL(0, 0), TL(1, 0), TL(2, 0), TL(3, 0), . . . , TL(M−1, N−1) are generated as shown in FIG. 13.

In step S62, each of the M×N tile areas is further divided into α×β segment areas. In step S63, average density for each of R, G and B is calculated with respect to each of the divided segment areas.

Figure 17:
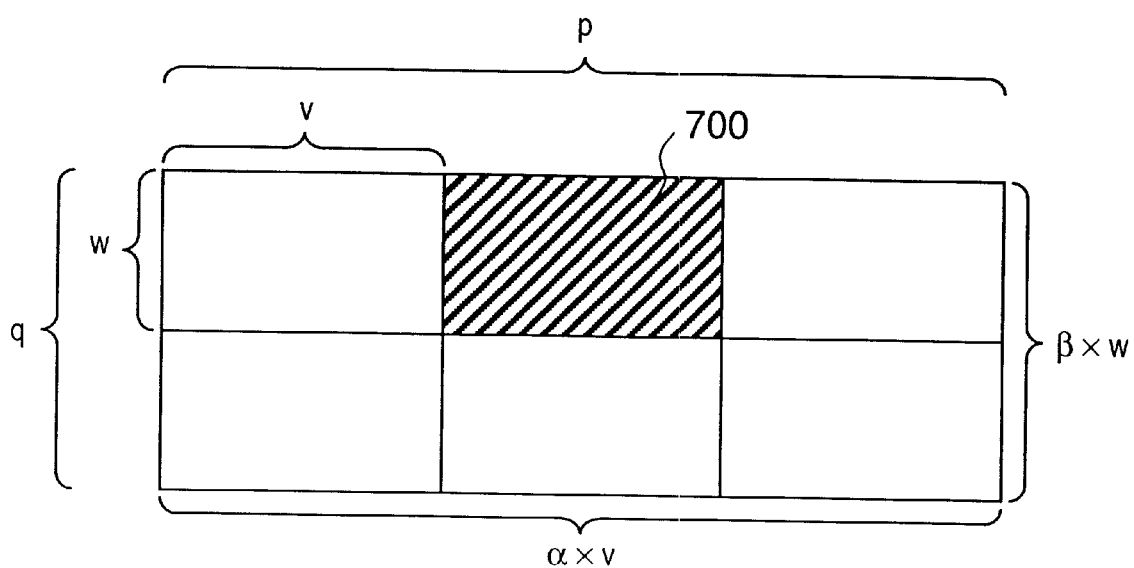
FIG. 17 is an explanatory view showing a division example of a texture image and a tile area into segment areas according to the fifth embodiment.

FIG. 17 shows a tile area divided into segment areas. Herein, each tile area having p×q pixels as described above, is divided into α×β uniform segment areas. FIG. 17 shows a case of α=3 and β=2. Assuming that the size of a segment area is v×w pixels, the following relations generally stand:

$$v \times \alpha = p$$

$$w \times \beta = q$$

With respect to each segment area (I, J) where $0 \leq I \leq \alpha-1$ and $0 \leq J \leq \beta-1$ stand, average density (pixel value) is calculated by the following equation (17).

$$R_{I,J} = \sum_{i=0}^{vw-1} Ri/(vxw) \quad \text{(average density of } R \text{ for segment area (I,J))} \tag{17}$$

$$G_{I,J} = \sum_{i=0}^{vw-1} Gi/(vxw) \quad \text{(average density of } G \text{ for segment area (I,J))}$$

$$B_{I,J} = \sum_{i=0}^{vw-1} Bi/(vxw) \quad \text{(average density of } B \text{ for segment area (I,J))}$$

Herein, ΣRi indicates the sum of R components in the pixels included in the segment area. ΣGi and ΣBi also indicate the same for respective colors.

For instance, $R_{1,0}$ indicates average density of R component in the segment area 700 shown by hatching in FIG. 17.

In step S64, each of P sheets of texture images 203 is divided into α×β uniform segment areas. In step S65, average density for each of R, G and B is calculated with respect to each segment area of the texture image which has been divided. Assume that the size of each texture image is p'×q' pixels, each texture image is divided into α×β pixels, then divided into v'×w' pixels. By this, the following relations stand:

$$v' \times \alpha = p'$$

$$\omega' \times \beta = q'$$

With respect to each segment area (I, J) where $0 \leq I \leq \alpha-1$ and $0 \leq J \leq \beta-1$ stand, the following equation (18) stands as similar to equation (17).

$$R'_{I,J} = \sum_{i=0}^{v'w'-1} Ri/(v'xw') \quad (18)$$

$$G'_{I,J} = \sum_{i=0}^{v'w'-1} Gi/(v'xw')$$

$$B'_{I,J} = \sum_{i=0}^{v'w'-1} Bi/(v'xw')$$

In step S66, the counters X_pos ($0 \leq$ X_pos $\leq$ M−1) and Y_pos ($0 \leq$ Y_pos $\leq$ N−1), indicative of the position of a tile area subjected to processing in the first image 201, are initialized to 0.

In step S67, the most optimum texture image 203 for the area, designated by the position counter X_pos and Y_pos, is selected from P sheets of texture images 203.

Herein, a difference $\Delta E$ of average density from a tile area to a texture image is defined as follows.

$$\Delta E = \sum_{I=0}^{\alpha-1} \sum_{J=0}^{\beta-1} \{(R'_{I,J} - R_{I,J})^2 + (G'_{I,J} - G_{I,J})^2 + (B'_{I,J} - B_{I,J})^2\}$$

Herein, the difference is obtained between the average density ($R'_{I,J}$, $G'_{I,J}$, $B'_{I,J}$) for each segment area of a texture image and average density ($R_{I,J}$, $G_{I,J}$, $B_{I,J}$) for each segment area of a tile area, and the obtained difference is squared and the sum $\Delta E$ of the squared difference is obtained. Then, a texture image having the minimum value of $\Delta E$ is selected as a most optimum texture image for the subject area.

In a case of $\alpha=\beta=1$, if a tile area has a flat color distribution, problems do not arise although data indicating a color difference and luminance distribution in the tile area of the first image 201 is lost. However, in a case where the tile area includes an edge, a problem arises in that a most appropriate texture image cannot be selected.

On the other hand, in a case of $\alpha>1$ and $\beta>1$ (($\alpha$ and $\beta$ are positive integers), each tile area of the first image 201 can be matched with a texture image while expressing the color distribution in the tile area, and appropriate texture image selection is possible. Accordingly, quality of a generated mosaic image can be improved.

In step S68 in FIG. 16, the position counter X_pos is incremented by 1 to refer to the next area. When the value of the position counter X_pos becomes larger than a value of the right end ("3" in FIG. 3), the position counter Y_pos is incremented by 1 and the position counter X_pos is initialized to 0. In step S69, it is determined whether or not the aforementioned processes are completed for all the tile areas of the first image 201. Until it is determined completed, steps S66 to 69 are repeated.

Note that the calculation in equations (17) and (18) may be executed by software as described above, or by dedicated hardware.

Figure 18:
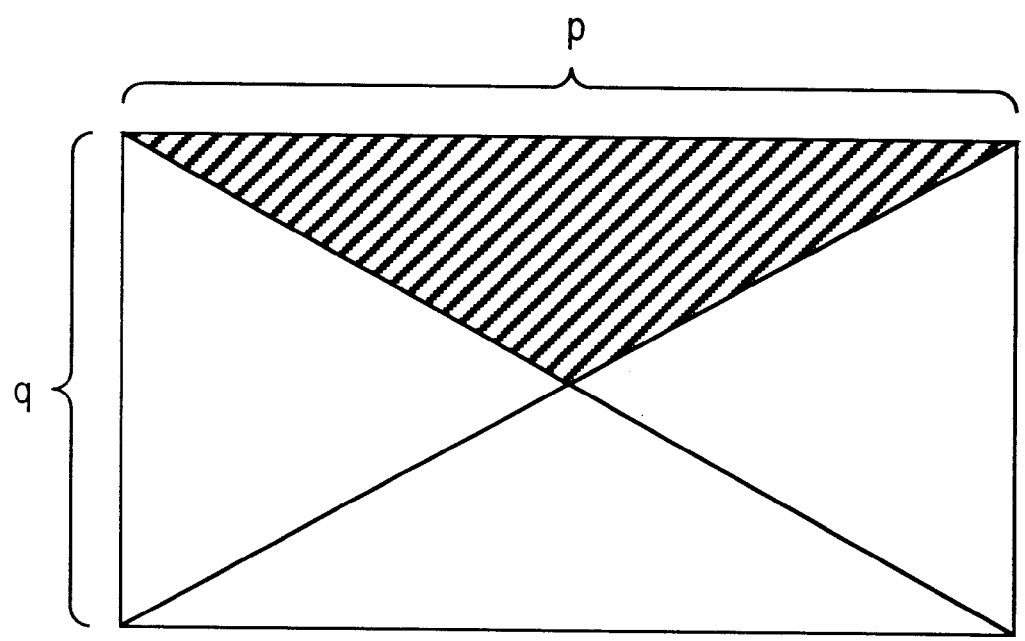
FIG. 18 is an explanatory view showing another division example of a texture image and a tile area into segment areas according to the fifth embodiment.

Note that the divided segment area in the fifth embodiment is not limited to a rectangular area as described above, but may be a non-rectangular area as shown in FIG. 18.

Furthermore, although the average density is calculated for R, G and B values of a pixel in the fifth embodiment, the average density may be calculated based on image data specified by the color space such as Yuv or L*a*b* mentioned in the second embodiment.

Moreover, instead of calculating an average density value for R, G and B, average luminance may be calculated to realize the fifth embodiment.

Sixth Embodiment

Figure 19:
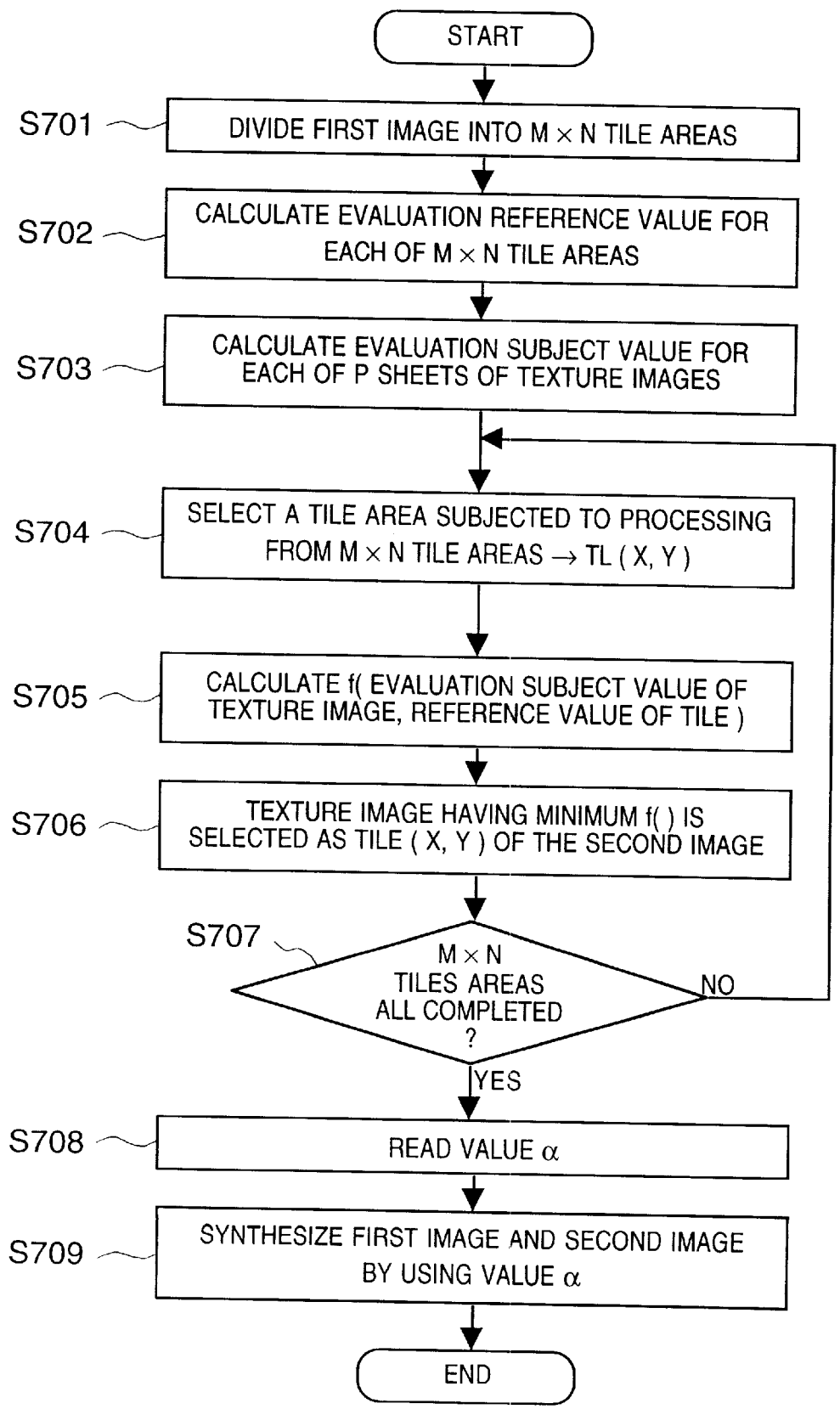
FIG. 19 is a flowchart showing producing steps of a mosaic image according to a sixth embodiment of the present invention.

Next, the method of constructing a mosaic image is described with reference to FIG. 19. FIG. 19 is a flowchart showing production steps of a mosaic image according to the sixth embodiment of the present invention.

In step S701, the first image 201 is divided into M×N tile areas as shown in FIG. 13. As a result, M×N rectangular tile areas TL(0, 0), TL(1, 0), TL(2, 0), . . . , TL(2, 4), TL(3, 4) are generated as shown in FIG. 3.

In step S702, an evaluation reference value is calculated with respect to each of the M×N tile areas divided in step S701. In order to construct a mosaic image, a tile area of the first image 201 and the texture image 203 to be pasted on the tile area must have a similarity under a predetermined evaluation criteria. More specifically, a variate (hereinafter referred to as a characteristic amount) is calculated by a predetermined method using data from the first image 201, and a value (hereinafter referred to as an evaluation reference value) obtained for an image of each tile area is compared with a value (hereinafter referred to as an evaluation subject value) obtained from each of the texture images 203. Then, a texture image 203 having the closest value substitutes for the tile area.

Note that an evaluation reference value is obtained by calculating a characteristic amount with respect to each image of the tile areas in the first image 201 by using a predetermined technique. As an example of the characteristic amount, average luminance for each of R, G and B can be used as described in the first embodiment. In this case, the evaluation reference value (Rd_av, Gd_av, Bd_av) can be calculated by equations (1) to (3). Other characteristic amounts, e.g., average density of each image, may also be used as an evaluation reference value.

In step S703, an evaluation subject value is calculated with respect to each of the P sheets of texture images. The evaluation subject value is obtained by calculating a characteristic amount, similar to that obtained in step S702, with respect to each of the texture images. Therefore, in a case of using average luminance of R, G and B as the characteristic amount, the evaluation subject value (Rs_av, Gs_av, Bs_av) can be obtained by equations (4) to (6).

In step S704, a tile area subjected to processing is selected from the M×N tile areas. Herein, a tile area is designated by using the counters X_pos ($0 \leq$ X_pos $\leq$ M−1) and Y_pos ($0 \leq$ Y_pos $\leq$ N−1) indicative of the position of the tile area. For example, in a case of starting the process from the top left tile area and proceeding toward the right end, then moving downward in the first image 201, X_pos and Y_pos are first initialized to 0, then as the steps S704 to S707 are repeated, the counter values are incremented as (X_pos, Y_pos)=(0, 0), (1, 0), . . . , (3, 0), (0, 1), . . . , (3, 1), . . . , (0, 4), . . . , (3, 4).

In step S705, the evaluation reference value (Rd_av, Gd_av, Gd_av) of the tile area subjected to processing, and the evaluation subject value (Rs_av, Gs_av, Bs_av) of respective P sheets of texture images 203 are evaluated by an evaluation function f( ). As an example of the evaluation function f( ), a mean square of a difference between the evaluation reference value and evaluation subject value may be used. In this case, the evaluation value can be obtained by equation (7) described in the first embodiment.

Then in step S706, as a result of performing the evaluation function P times, the texture image 203 having the minimum f( ) is selected and determined as an image to be pasted on the corresponding tile position (designated by (X_pos, Y_pos)).

In step S707, it is determined whether or not the aforementioned process has been performed for all the tile areas of the first image 201. If there is a tile area not yet processed, the control returns to step S704 for repeating the above-described process. If the process for all the tile areas has been completed, the control proceeds to step S708.

In step S708, a value $\alpha$ inputted by an operator. through the keyboard 104 or the like is read. Note that the value $\alpha$ is 0 or larger and less than or equal to 1.

In step S709, the first image 201 and generated second image 202 are synthesized using the value $\alpha$ to produce a third image, which ultimately serves as a mosaic image.

As an example of a synthesizing method using the value $\alpha$ to produce the third image, the first image 201 multiplied by $\alpha$ and the second image 202 multiplied by $(1-\alpha)$ are added. More specifically, assuming that the pixel values at the same position of the first image 201 and second image 202 are (R1, G1, B1) and (R2, G2, B2) respectively, a pixel value (R3, G3, B3) at the same position of a third image can be obtained by the following equation (19).

$$R3 = \alpha \times R1 + (1-\alpha)R2$$
$$G3 = \alpha \times G1 + (1-\alpha)G2$$
$$B3 = \alpha \times B1 + (1-\alpha)B2 \quad (19)$$

As has been described above, according to the sixth embodiment, even in a case where colors and textures of the second image 202 produced by the mosaic image producing method are far different from that of the first image 201, a third image which best expresses the first image can be produced by using a factor (value $\alpha$) set by an operator. As a result, a mosaic image which is similar to the first image 201 can be obtained. Accordingly, even with a small number of texture images, a high-quality mosaic image can be produced.

Seventh Embodiment

Next, the seventh embodiment of the present invention is described. The following description mainly explains the point different from the sixth embodiment.

Figure 20:
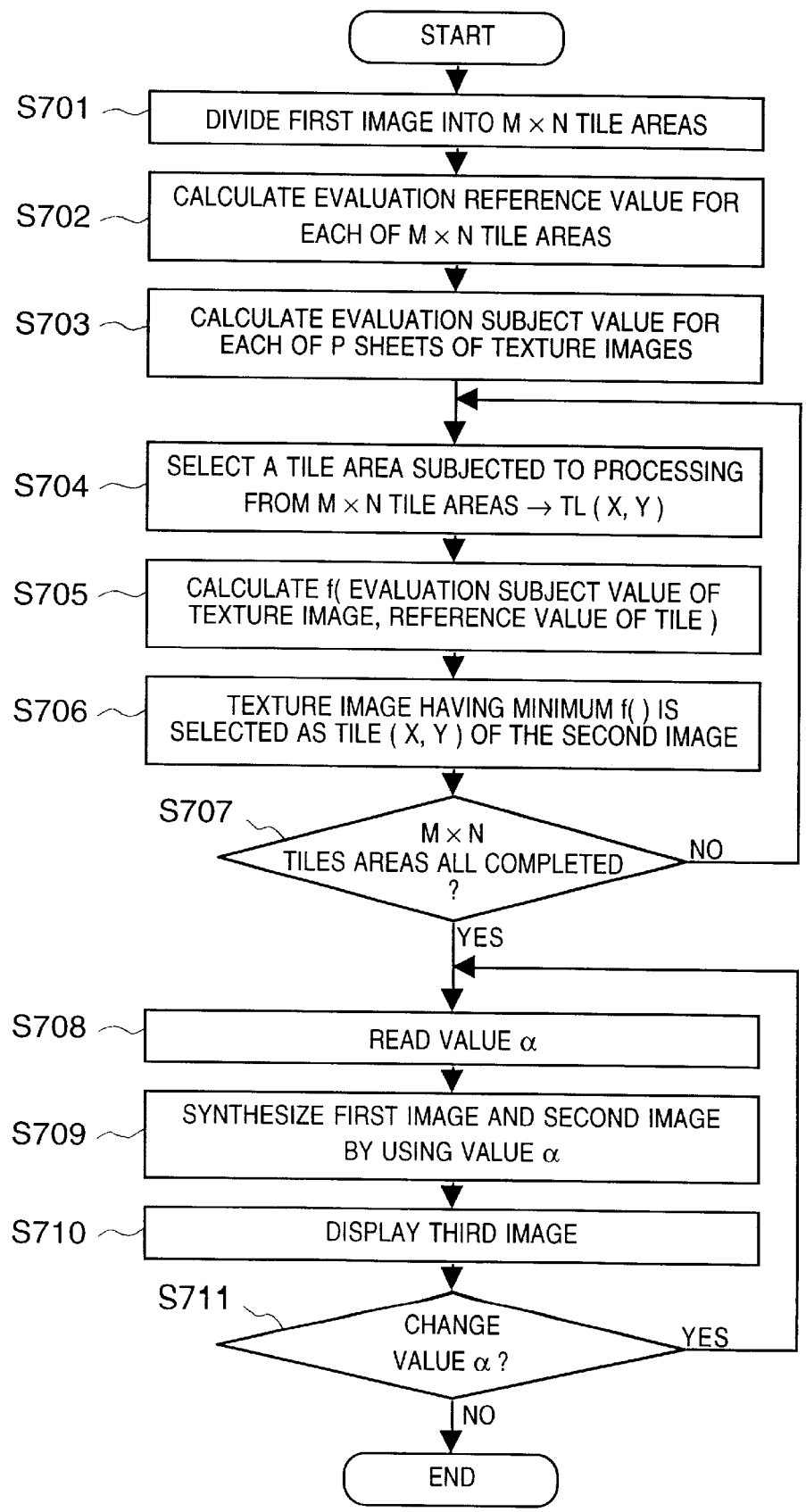
FIG. 20 is a flowchart showing a producing process of a mosaic image according to a seventh embodiment of the present invention.

FIG. 20 is a flowchart showing steps of mosaic image production according to the seventh embodiment of the present invention. Similar to the sixth embodiment, steps S701 to S709 are executed, and the first image 201 and second image 202 are synthesized to obtain the third image.

In step S710, the obtained third image is displayed in the display unit 105. In step S711, an interface which allows an operator to change the value a is displayed, and determination is made whether or not the operator has changed the value $\alpha$. If the value $\alpha$ is changed, the control returns to step S708 for generating a third image by using the changed value $\alpha$ and displaying the generated third image on the display unit 105.

Figure 21:
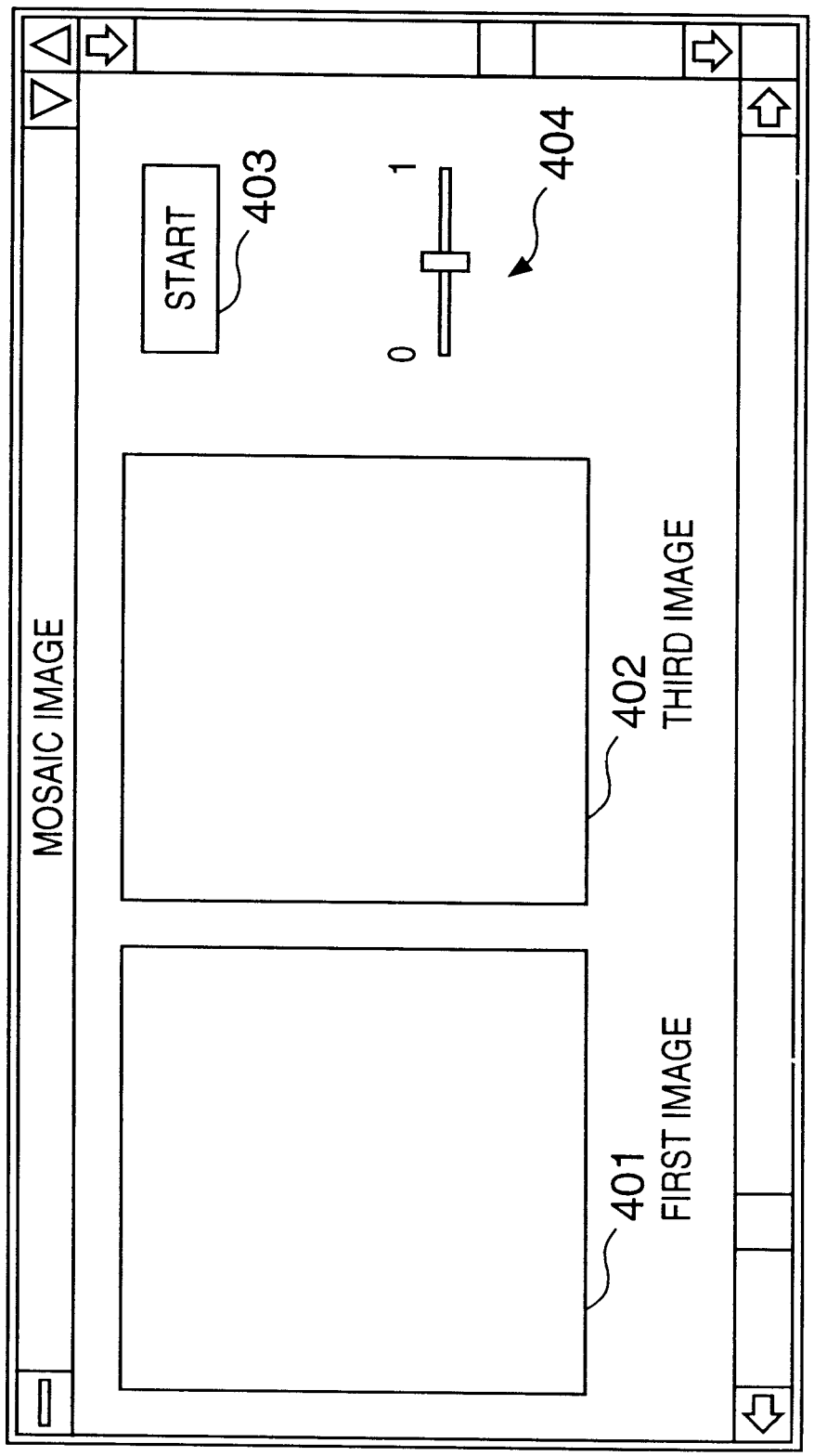
FIG. 21 is an example of a user interface for changing a value α.

FIG. 21 shows an example of a user interface displayed for changing the value $\alpha$. The user interface shown in FIG. 21 is displayed in the display unit 105. In FIG. 21, reference numeral 401 denotes a display area of the first image 201; and 402, a display area of the third image. Reference numeral 403 denotes a start button instructing a start of the process; and 404, a slider for changing the value $\alpha$. Note that an area for displaying the second image 202 may be provided above this screen so that an operator can refer to the second image 202 when setting the value $\alpha$.

Before depressing the start button 403, the first image 201 is displayed in the display area 401. When the start button 403 is depressed, the flowchart shown in FIG. 20 starts from step S701. When the process in step S709 is completed, the third image is displayed in the display unit 402. Then, the slider 404 is operated by using the mouse 104a. Assume that the slider 404 has $\alpha=0$ at the far left end and $\alpha=1$ at the far right end, and is equally divided.

When the slider 404 is positioned at the far left end ($\alpha=0$), equation (19) is expressed as follows.

$$R3 = \alpha \times R1 + (1-\alpha)R2 = R2$$
$$G3 = \alpha \times G1 + (1-\alpha)G2 = G2$$
$$B3 = \alpha \times B1 + (1-\alpha)B2 = B2$$

Therefore, the third image is equal to the second image 202.

Moreover, when the slider 404 is positioned at the far right end ($\alpha=1$), equation (19) is expressed as follows.

$$R3 = \alpha \times R1 + (1-\alpha)R2 = R1$$
$$G3 = \alpha \times G1 + (1-\alpha)G2 = G1$$
$$B3 = \alpha \times B1 + (1-\alpha)B2 = B1$$

Therefore, the third image is equal to the first image 201.

When $\alpha$ has a value between 0 and 1, the third image is a mixture of the first image 201 and the second image 202.

As described above, the seventh embodiment is so structured that the value $\alpha$ can be set interactively by using the input unit such as a mouse or the like so that the user can easily produce a mosaic image by synthesizing the first image and second image as desired.

Eighth Embodiment

An eighth embodiment of the present invention is now described. The image processing apparatus according to the eighth embodiment has the same hardware structure as that of the above-described embodiments. Therefore, description thereof will be omitted.

Figure 22:
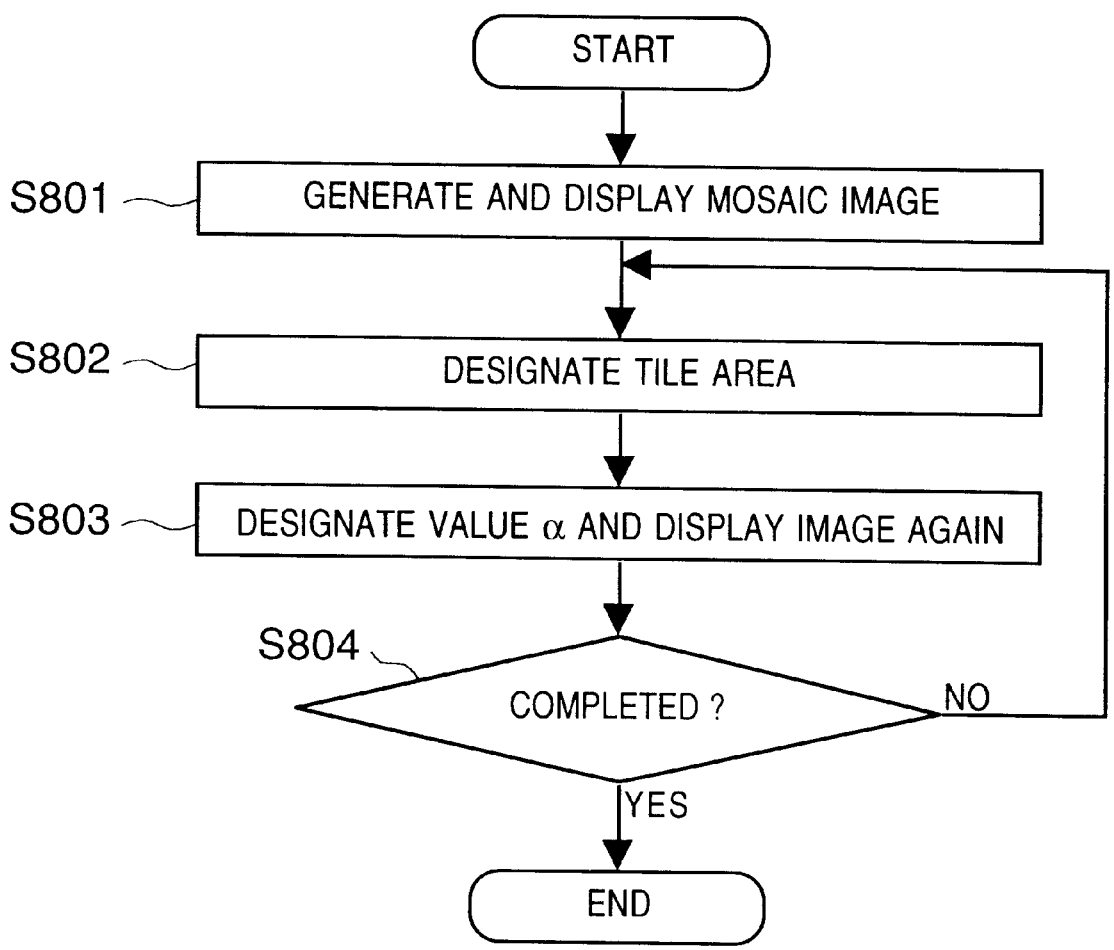
FIG. 22 is a flowchart showing a producing process of a mosaic image according to an eighth embodiment of the present invention.

FIG. 22 is a flowchart showing a brief flow of a mosaic image production process according to the eighth embodiment of the present invention. The control program which executes this process is stored in the RAM 122 or memory 102, and executed under the control of the CPU 101.

First in step S801, the first image 201 is divided into a plurality of tile areas, and appropriate texture images are selected from the P sheets of texture images 203 for respective tile areas, then synthesized to generate a mosaic image 202. In steps S802 and S803, the aforementioned value $\alpha$ is set, and a tile area subjected to changing is interactively designated by an operator using the keyboard 104 or mouse 104a. In other words, in step S802, the operator determines a tile area which poorly expresses the original image 201 and instructs to correct the texture image of the tile area according to the value $\alpha$.

Figure 23:
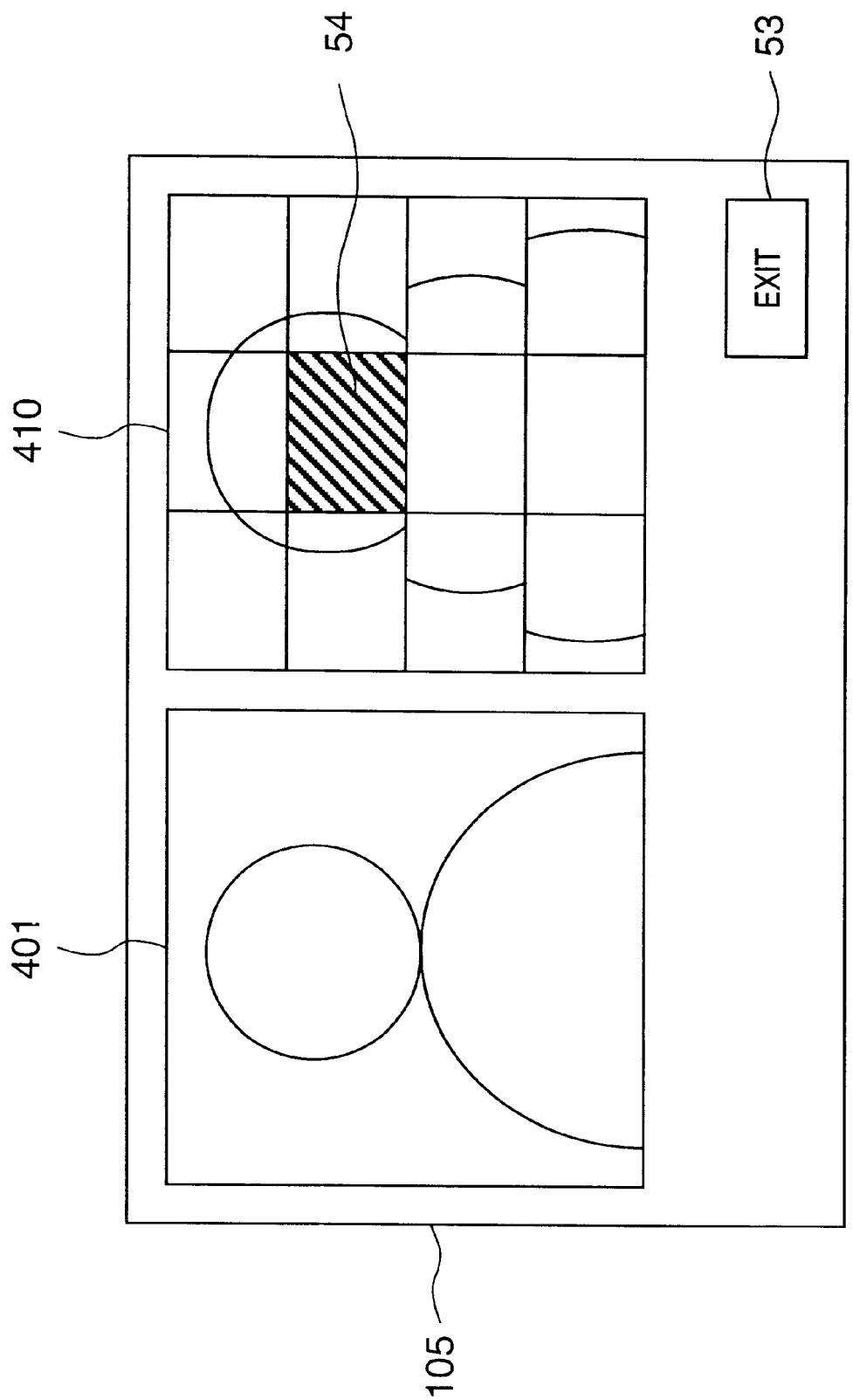
FIG. 23 is a display example according to the eighth embodiment.

In the display unit 105, image display as shown in FIG. 23 is performed. Reference numeral 401 denotes a display area of an original image 201, and 410 denotes a display area for a synthesized mosaic image 202. Reference numeral 53 denotes a button for instructing to end the control. When an operator designates, for instance, the tile area 54, indicated by hatching, with the mouse 104a, the control proceeds from step S802 to step S803.

Figure 24:
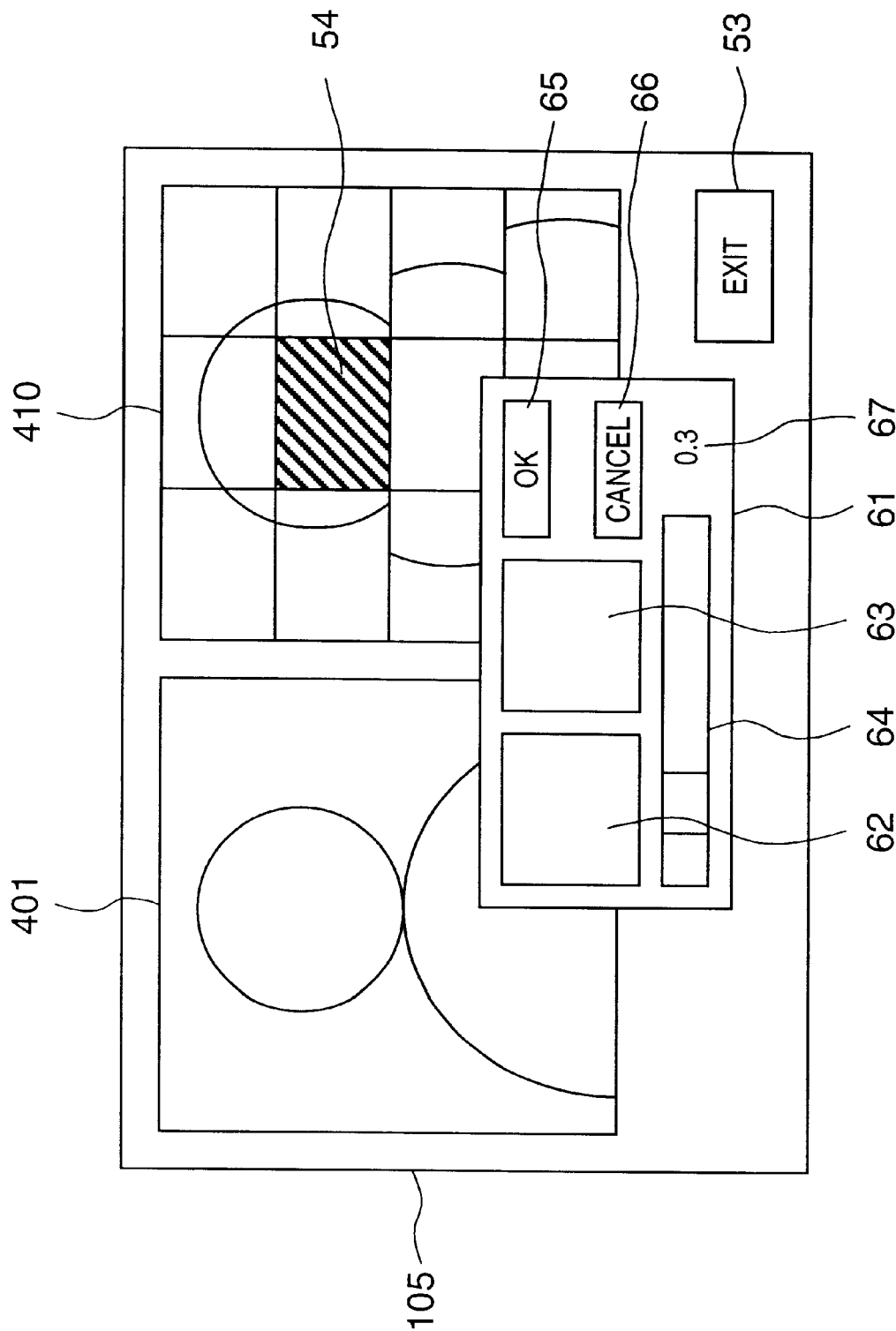
FIG. 24 is a display example for setting the value α interactively.

In step S803, a window 61 pops up in the display unit 105 as shown in FIG. 24. The operator specifies an appropriate value α for the tile area 54 by using the window 61. At this stage, the window 61 is displayed at the position so as not to hide the tile area 54 for operative convenience. Furthermore, the display position of the window 61 may be moved by the operator.

In the window 61, reference numeral 62 denotes a display area for displaying a texture image 203 originally selected for the tile area 54. Reference numeral 63 denotes a display area for displaying a corrected texture image, obtained by correcting the original image 201 with the value α by the process to be described later. Reference numeral 64 denotes a scroll bar corresponding to the reference numeral 404 in FIG. 21, which is used for setting the value α. Reference numeral 65 denotes a button for confirming the changed value α; 66, a cancel button; and 67, a display area for digitally displaying the numeral of the set value α.

Assume that an operator changes the value α by operating the scroll bar 64. As the value α is changed, the value α is digitally displayed in the display area 67. Furthermore, in conjunction with such operation, the texture image integrates the characteristics of the original image 201 in accordance with the changed value α, and displayed in the display area 63. Therefore, the operator can set a value α which realizes a texture image which best expresses the original image 201, while confirming the texture image which is being corrected according to the value α and displayed in the display area 63. Note that if the value α is set too small, the quality of the mosaic image 202 is deteriorated. In other words, a mosaic image which accurately expresses the original image 201 cannot be produced. On the other hand, if the value α is set too large, the characteristics of the texture image is lost and the nature of a mosaic image is lost. Since an operator can set the value α while actually observing the texture image corrected according to the value α, a high quality mosaic image can be produced.

After determining the value α, if the operator wishes to confirm the value α, the confirm button 65 is depressed, while if the operator wishes to cancel the value α, the cancel button 66 is depressed. When the confirm button 65 is depressed, the corrected texture image displayed in the display area 63 is copied to the tile area 54 of the mosaic image 202 and the window 61 is closed. When the cancel button 66 is depressed, the window 61 is closed and the process ends.

In step S804 in FIG. 22, it is determined whether or not the α-value setting is to be continued. If the operator depresses the button 53, the control ends. Otherwise, the control returns to step S802 for executing α-value setting for another tile area.

Correction Process of Texture Image Based on Characteristics of Original Image FIG. 25 is a flowchart showing a correction process of a texture image to be synthesized based on the characteristics of the original image 201, according to the eighth embodiment of the present invention. The program which executes this process is stored in the RAM 122 or memory 102.

Assume that a pixel value of a tile area of the original image 201 is (R1, G1, B1), and a corresponding pixel value of the texture image 203 (already selected in step S801) is (R2, G2, B2).

In step S901, a variable j indicative of the pixel position in the vertical direction is initialized to 0. In step S902, a variable i indicative of the pixel position in the horizontal direction is initialized to 0. These variables j and i are set in the RAM 122.

In step S903, the pixel (R2, G2, B2) of the texture image 203 is updated by the following equation.

$$R2 \leftarrow \alpha \times R1 + (1-\alpha)R2$$

$$G2 \leftarrow \alpha \times G1 + (1-\alpha)G2$$

$$B2 \leftarrow \alpha \times B1 + (1-\alpha)B2$$

In step S904, the variable i is incremented by 1. In step S905, the variable i is compared with the number of pixels p (see FIG. 3). If the variable i is not equal to p, it means that the processing is not yet completed for the pixels in the horizontal direction of the tile area. Thus, the control returns to step S903. When the processing on all pixels in the row of the tile area is completed, the control proceeds to step S906 where the variable j is incremented by 1. In step S907, the variable j is compared with the number of pixels q (see FIG. 3). If the variable j is not equal to q, it means that the processing is not yet completed for the pixels in the vertical direction of the tile area. Thus, the control returns to step S902 where the variable i is initialized to 0 and executing the above-described control. When j=q stands in step S907, it is determined that the processing for all pixels in the tile area is completed, and this control ends.

In the foregoing equation, if α=1, (R2, G2, B2)=(R1, G1, B1) stands, i.e., the color of the texture image 203 becomes equal to the corresponding tile area of the original image 201. If α=0, (R2, G2, B2)=(R2, G2, B2) stands, i.e., the color of the texture image 203 does not change. By varying the value α between 0 and 1, the color of the texture image 203 can be changed in accordance with the color of the corresponding tile area of the original image 201.

Note that in step S803 in FIG. 22, the texture image displayed in the display area 63 is updated in conjunction with movement of the scroll bar 64 operated by an operator. However, since such image updating process takes a great amount of processing time, a response to the scroll bar operation becomes poor. In this case, the texture image in the display area 63 is updated only when the scroll bar moving operation is completed. By this, the response rate can be improved. More specifically, during the time an operator clicks a knob of the scroll bar 64 with a button of the mouse 104a to drag the scroll bar 64, the texture image in the display area 63 is not updated, but only the value α is updated and displayed in the area 67. When the operator releases the button of the mouse 104a and finishes dragging, the texture image is updated according to the value α and displayed in the display area 63.

In the above-described eighth embodiment, texture image correction using the value α is not performed during production of a mosaic image, but a texture image corresponding to the tile area designated by the operator is corrected after a mosaic image is produced. Besides this, for instance, an appropriate value α may be set for all the tile areas and a texture image correction based on the predetermined value α may be performed. Then, the value α may be changed for a tile area specified by an operator and the corresponding texture image may be corrected accordingly.

Ninth Embodiment

Next, a ninth embodiment of the present invention is described. The ninth embodiment is characterized in that the aforementioned value α is determined automatically.

FIG. 26 is a flowchart showing a process of calculating a most appropriate value α according to the ninth embodiment.

In step S911, if the size of a selected texture image 203 differs from the size of the corresponding tile area, the size of the texture image 203 is changed to have the same size (p×q pixels) as the corresponding tile area. For the size changing processing, the well-known nearest neighbor interpolation, bi-linear interpolation, cubic convolution interpolation or the like may be used.

In step S912, a variable j which designates the pixel position in the vertical direction and a variable e are respectively initialized to 0. In step S913, the variable i which designates the pixel position in the horizontal direction is initialized to 0. Note that these variables are set in the RAM 105.

In step S914, a square difference between the pixel in the tile area designated by the variable (i, j) and the pixel of the texture image 203 is calculated.

Herein, assuming that the pixel value in the tile area designated by (i, j) and the pixel value in the texture image 203 whose size has been changed, are respectively (R1, G1, B1) and (R2, G2, B2), the square difference is inputted to the variable e by the following equation.

$$e \leftarrow e + |R1-R2|^2 + |G1-G2|^2 + |B1-B2|^2$$

In step S915, the variable i is incremented by 1. In step S916, the variable i is compared with the number of pixels p in the horizontal direction of the tile area, and if the variable i is not equal to p, the control returns to step S914 for repeating the aforementioned process. When the process is completed for all number of pixels p in the horizontal direction, the control proceeds to step S917 where the variable j is incremented by 1. In step S918, the variable j is compared with the number of pixels q in the vertical direction of the tile area, and if the variable j is not equal to q, the control returns to step S913 to initialize the variable i to 0, then proceeds to step S914.

When the process is completed for the p×q pixels, the control proceeds to step S919 where the value α is calculated by the following equation.

$$\alpha = A/\sqrt{(e/(p \times q))}$$

Herein, "A" is a constant which determines the amount of mixing the images, and may be determined empirically or may be set arbitrarily by a user. Moreover, e/(p×q) expresses an average density difference for each color component in the entire pixels of the tile area (texture image).

After the value α is determined, the control proceeds to step S709 in FIG. 19. In accordance with the calculated value α, the selected texture image is changed based on the texture image and the corresponding tile area of the original image 201. Then, the changed texture image is pasted on the tile area.

As described above, the texture image is corrected according to the flowchart in FIG. 26.

Note that in the foregoing descriptions, although the first to ninth embodiments are described separately, each of these embodiments may be combined.

Furthermore, although the average density is calculated for R, G and B values of a pixel in the above-described embodiments, the average density may be calculated based on image data specified by another color space such as Yuv or L*a*b* mentioned in the second embodiment. Moreover, instead of calculating an average density value for R, G and B, average luminance may be calculated to realize the foregoing embodiments.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for combining a plurality of texture images in a mosaic-like manner and generating a mosaic image, comprising:
   division means for dividing an original image into a plurality of areas;
   calculation means for calculating an average pixel value of each of the plurality of areas divided by said division means;
   storage means for storing a plurality of texture images together with an average pixel value of each of the plurality of texture images;
   selection means for comparing the average pixel value calculated by said calculation means with the average pixel value of each of the plurality of texture images stored in said storage means, and selecting a texture image for the each area, having an average pixel value which is one of the closest to that of each of the plurality of areas; and
   generation means for generating an image in which the texture images selected by said selection means substitute for the plurality of areas.

2. The image processing apparatus according to claim 1, further comprising computation means for computing an average pixel value of each of the plurality of texture images stored in said storage means.

3. The image processing apparatus according to claim 1, wherein said calculation means calculates an average pixel value per pixel with respect to each of R. G and B color components.

4. The image processing apparatus according to claim 1, wherein said selection means sequentially selects the plurality of areas, calculates a difference between the average pixel value of a selected subject area and the average pixel value of each of the plurality of texture images, and selects a texture image having a minimum difference as a texture image for the subject area.

5. An image processing apparatus for combining a plurality of texture images in a mosaic-like manner and generating a mosaic image, comprising:
   division means for dividing an original image into a plurality of areas;
   first calculation means for calculating an average pixel value of each of the plurality of areas divided by said division means;
   storage means for storing a plurality of texture images;
   selection means for comparing the average pixel value calculated by said first calculation means with an average pixel value of each of the plurality of texture images, and selecting a texture image for the each area, having an average pixel value which is one of the closest to that of each of the plurality of areas;
   generation means for generating an image in which the texture images selected by said selection means substitute for the plurality of areas;
   second calculation means for calculating a component representing lightness and component representing chromaticity for each of the plurality of areas divided by said division means;
   texture image selection means for comparing the component representing lightness and component representing chromaticity for each of the plurality of areas, calculated by said second calculation means, with a component representing lightness and component representing chromaticity for each of the plurality of texture images, and selecting a texture image for the each area, having a closest component representing lightness and component representing chromaticity to that of each of the plurality of areas; and instruction means for instructing said generation means to generate an image based on either the texture image selected by said selection means or the texture image selected by said texture image selection means.

6. An image processing apparatus for combining a plurality of texture images in a mosaic-like manner and generating a mosaic image, comprising:

division means for dividing an original image into a plurality of areas;

calculation means for calculating an average pixel value of each of the plurality of areas divided by said division means;

storage means for storing a plurality of texture images;

selection means for comparing the average pixel value calculated by said calculation means with an average pixel value of each of the plurality of texture images, and selecting a texture image for the each area, having an average pixel value which is one of the closest to that of each of the plurality of areas;

generation means for generating an image in which the texture images selected by said selection means substitute for the plurality of areas; and error diffusion means for diffusing an average pixel value difference between the texture image selected by said selection means and the subject area to a neighboring area of the subject area, wherein said selection means compares an average pixel value of an area, changed by said error diffusion means, with the average pixel value of the texture image, and selects a texture image for the area, having an average pixel value which is one of the closest to that of each of the plurality of areas.

7. The image processing apparatus according to claim 6, wherein said error diffusion means distributes the difference to a pixel value in an area in the next right of the subject area.

8. The image processing apparatus according to claim 6, wherein said error diffusion means distributes the difference to a pixel value in an area in the next right or below the subject area.

9. An image processing apparatus for combining a plurality of texture images in a mosaic-like manner and generating a mosaic image, comprising:

division means for dividing an original image into a plurality of areas;

calculation means for calculating an average pixel value of each of the plurality of areas divided by said division means;

storage means for storing a plurality of texture images:

selection means for comparing the average pixel value calculated by said calculation means with an average pixel value of each of the plurality of texture images, and selecting a texture image for the each area, having an average pixel value which is one of the closest to that of each of the plurality of areas;

generation means for generating an image in which the texture images selected by said selection means substitute for the plurality of areas; and synthesizing means for synthesizing each of the plurality of areas with the image, generated by said generation means for corresponding area of the plurality of areas, at a synthesis ratio determined in accordance with a predetermined coefficient.

10. The image processing apparatus according to claim 9, wherein the predetermined coefficient takes a value of 0 or larger and less than or equal to 1.

11. The image processing apparatus according to claim 9, further comprising a user interface which enables an operator to set the predetermined coefficient.

12. An image processing method of combining a plurality of texture images stored in a memory with correspondence to an average pixel value in each of the plurality of texture images, in a mosaic-like manner, and generating a mosaic image, comprising the steps of:

a division step of dividing an original image into a plurality of areas;

a calculation step of calculating an average pixel value of each of the plurality of areas divided in said division step:

a selection step of comparing the average pixel value calculated in said calculation step with the average pixel value of each of a plurality of texture images stored in the memory and selecting a texture image for the each area, having an average pixel value which is one of the closest to that of each of the plurality of areas; and a generation step of generating an image in which the texture images selected in said selection step substitute for the plurality of areas.

13. The image processing method according to claim 12, further comprising a computation step of computing an average pixel value of each of the plurality of texture images stored in memory.

14. The image processing method according to claim 12, wherein said calculation step calculates an average pixel value per pixel with respect to each of R, G and B color components.

15. The image processing method according to claim 12, wherein in said selection step, the plurality of areas are sequentially selected, a difference between the average pixel value of a selected subject area and the average pixel value of each of the plurality of texture images is calculated, and a texture image having a minimum difference is selected as a texture image for the subject area.

16. An image processing method of combining a plurality of texture images in a mosaic-like manner and generating a mosaic image, comprising the steps of:

a division step of dividing an original image into a plurality of areas;

a calculation step of calculating an average pixel value of each of the plurality of areas divided in said division step;

a selection step of comparing the average pixel value calculated in said calculation step with an average pixel value of each of a plurality of texture images and selecting a texture image for the each area, having an average pixel value which is one of the closest to that of each of the plurality of areas;

a generation step of generating an image in which the texture images selected in said selection step substitute for the plurality of areas;

a second calculation step of calculating a component representing lightness and component representing chromaticity for each of the plurality of areas divided in said division step;

a texture image selection step of comparing the component representing lightness and component representing chromaticity for each of the plurality of areas, calculated in said calculation step, with a component representing lightness and component representing chromaticity for each of the plurality of texture images, and selecting a texture image for the each area, having a closest component representing lightness and component representing chromaticity to that of each of the plurality of areas; and an instruction step of instructing to generate an image based on either the texture image selected in said selection step or the texture image selected in said texture image selection step.

17. An image processing method of combining a plurality of texture images in a mosaic-like manner and generating a mosaic image, comprising the steps of:

a division step of dividing an original image into a plurality of areas;

a calculation step of calculating an average pixel value of each of the plurality of areas divided in said division step;

a selection step of comparing the average pixel value calculated in said calculation step with an average pixel value of each of a plurality of texture images and selecting a texture image for the each area, having an average pixel value which is one of the closest to that of each of the plurality of areas;

a generation step of generating an image in which the texture images selected in said selection step substitute for the plurality of areas; and an error diffusion step of diffusing an average pixel value difference between the texture image selected in said selection step and the subject area to a neighboring area of the subject area, wherein in said selection step, an average pixel value changed in said error diffusion step is compared with the average pixel value of the texture image, and a texture image having an average pixel value which is one of the closest to that of each of the plurality of areas is selected.

18. The image processing method according to claim 17, wherein in said error diffusion step, the difference is distributed to a pixel value in an area in the next right of the subject area.

19. The image processing method according to claim 17, wherein in said error diffusion step, the difference is distributed to a pixel value in an area in the next right or below the subject area.

20. An image processing method of combining a plurality of texture images in a mosaic-like manner and generating a mosaic image, comprising the steps of:

a division step of dividing an original image into a plurality of areas;

a calculation step of calculating an average pixel value of each of the plurality of areas divided in said division step;

a selection step of comparing the average pixel value calculated in said calculation step with an average pixel value of each of a plurality of texture images and selecting a texture image for the each area, having an average pixel value which is one of the closest to that of each of the plurality of areas;

a generation step of generating an image in which the texture images selected in said selection step substitute for the plurality of areas; and a synthesizing step of synthesizing each of the plurality of areas with the image, generated in said generation step for corresponding area of the plurality of areas, at a synthesis ratio determined in accordance with a predetermined coefficient.

21. The image processing method according to claim 20, wherein the predetermined coefficient takes a value of 0 or larger and less than or equal to 1.

22. The image processing method according to claim 20, further comprising a step of setting the predetermined coefficient by an operator.

23. An image processing method of combining a plurality of texture images in a mosaic-like manner and generating a mosaic image, comprising the steps of:

a division step of dividing an image into a plurality of areas;

a calculation step of calculating an average luminance value of color stimuli for each of the plurality of areas divided in said division step;

a selection step of selecting a texture image based on the average luminance value of each of the plurality of areas and an average luminance value of each of the plurality of texture images;

a generation step of generating an image in which the texture images selected in said selection step substitute for the plurality of areas; and a synthesizing step of synthesizing each of the plurality of areas with the image, generated in said generation step, at a synthesis ratio determined in accordance with a predetermined coefficient.

24. A storage medium which can be read by a computer having a program for executing an image processing method of combining a plurality of texture images in a mosaic-like manner and generating a mosaic image, comprising:

a division step module for dividing an original image into two-dimensional tile areas;

a calculation step module for calculating an average luminance value of color stimuli for each of the plurality of divided tile areas; and a selection step module for selecting a texture image for each tile area, based on the average luminance value of each of the plurality of tile areas and an average luminance value of each of the plurality of texture images.

25. A storage medium which can be read by a computer having a program for executing an image processing method of combining a plurality of texture images in a mosaic-like manner and generating a mosaic image, comprising:

a division step module for dividing an original image into two-dimensional tile areas;

a parameter calculation step module for calculating a L*a*b space parameter of color stimuli for each of the plurality of divided tile areas; and a selection step module for selecting a texture image for each tile area, based on the L*a*b space parameter of each of the plurality of tile areas and an L*a*b space parameter of each of the plurality of texture images.

26. A storage medium which can be read by a computer having a program for executing an image processing method of combining a plurality of texture images in a mosaic-like manner and generating a mosaic image, comprising:

a division step module for dividing an original image into a plurality of areas;

a computation step module for calculating an average density of each of the plurality of divided areas;

a texture image determination step module for determining a texture image to be assigned to a subject area based on the average density calculated by said computation step module and an average density of each of the plurality of texture images; and an error diffusion step module for diffusing an average density difference between the texture image determined by said texture image determination step module and the subject area to a neighboring area of the subject area.

27. A storage medium which can be read by a computer having a program for executing an image processing method of combining a plurality of texture images in a mosaic-like manner and generating a mosaic image, comprising:

a division step module for dividing an original image into a plurality of areas;

a calculation step module for calculating an average luminance value of color stimuli for each of the plurality of areas;

a selection step module for selecting a texture image for each area, based on the average luminance value of each of the plurality of areas and an average luminance value of each of the plurality of texture images;

a generation step module for generating an image in which the selected texture images substitute for the plurality of areas; and a synthesizing step module for synthesizing each of the plurality of areas with the image, generated by said generation step module, at a synthesis ratio determined in accordance with a predetermined coefficient.

28. An image processing apparatus for combining a plurality of texture images in a mosaic-like manner and generating a mosaic image, comprising:

storage means for storing a plurality of texture images;

division means for dividing an original image into a plurality of areas;

selection means for selecting a texture image for each area, having a color similar to each of the plurality of areas divided by said division means, from the plurality of texture images stored in said storage means;

generation means for generating a mosaic image in which the texture images selected by said selection means substitute for the plurality of areas;

color correction means for correcting a color of the texture image based on an area corresponding to the texture image and a set predetermnined coefficient, wherein the predetermined coefficient is $\alpha$, and the color of the texture image is corrected based on a sum of a product of $\alpha$ and a corresponding pixel value of an area in the original image and a product of $(1-\alpha)$ and a corresponding pixel value in a texture image, and wherein $0<\alpha<1$; and changing means for changing the predetermined coefficient.

29. The image processing apparatus according to claim 28, further comprising:

designation means for designating an area of the mosaic image generated by said generation means;

texture image display means for displaying a texture image assigned to the area designated by said designation means; and control means for controlling such that the texture image, whose color is corrected by said color correction means, is displayed in accordance with the predetermined coefficient changed by said changing means.

30. The image processing apparatus according to claim 29, wherein the texture image displayed by said texture image display means and the texture image whose color is corrected by said color correction means in accordance with the predetermined coefficient changed by said changing means, are displayed in parallel in a same screen.

31. The image processing apparatus according to claim 28, wherein said changing means changes the predetermined coefficient in an interactive manner with an operator.

32. An image processing method for an image processing apparatus which combines a plurality of texture images in a mosaic-like manner and generates a mosaic image, comprising the steps of:

a division step of dividing an original image into a plurality of areas;

a selection step of selecting a texture image for each area, having a color similar to each of the plurality of areas divided in said division step, from the plurality of texture images;

a generation step of generating a mosaic image in which the texture images selected in said selection step substitute for the plurality of areas;

a color correction step of correcting a color of the texture image based on an area corresponding to the texture image and a set predetermined coefficient, wherein the predetermined coefficient is $\alpha$, and the color of the texture image is corrected based on a sum of a product of $\alpha$, and a corresponding pixel value of an area in the original image and a product of $(1-\alpha)$ and a corresponding pixel value in a texture image, wherein $0<\alpha<1$.; and a changing step of changing the predetermined coefficient.

33. The image processing method according to claim 32, further comprising the steps of:

a designation step of designating an area of the mosaic image generated in said generation step;

a texture image display step of displaying a texture image assigned to the area designated in said designation step; and a control step of controlling such that the texture image, whose color is corrected in said color correction step, is displayed in accordance with the predetermined coefficient changed in said changing step.

34. The image processing method according to claim 33, wherein the texture image displayed in said texture image display step and the texture image whose color is corrected in said color correction step in accordance with the predetermined coefficient changed in said changing step, are displayed in parallel in a same screen.

35. The image processing method according to claim 32, wherein in said changing step, the predetermined coefficient is changed in an interactive manner with an operator.

36. The image processing apparatus according to claim 28, further comprising coefficient determination means for determining a coefficient for converting the texture image selected by said selection means in accordance with image data of a corresponding area of the plurality of areas.

37. The image processing apparatus according to claim 36, wherein said coefficient determination means determines the coefficient based on a mean square difference of a pixel density between the texture image selected by said selection means and a corresponding tile area of the plurality of areas.

38. The image processing apparatus according to claim 36, wherein said coefficient determination means determines the coefficient based on an average absolute difference of a pixel density between the texture image selected by said selection means and a corresponding tile area of the plurality of areas.

39. The image processing apparatus according to claim 36, wherein said coefficient determination means determines the coefficient based on a maximum difference of a pixel density between the texture image selected by said selection means and a corresponding tile area of the plurality of areas.

40. The image processing apparatus according to claim 36, wherein said coefficient determination means determines the coefficient based on at least one of the mean square difference of a pixel density, the average absolute difference, and a number of pixels having more than a predetermined pixel density difference between the texture image selected by said selection means and a corresponding tile area of the plurality of areas.

41. The image processing apparatus according to claim 36, wherein said coefficient determination means determines the coefficient so as not to exceed a predetermined value.

42. The image processing apparatus according to claim 36, wherein said coefficient determination means further comprises correction means for correcting the coefficient based on a coefficient for another area of the plurality of areas.

43. The image processing apparatus according to claim 42, wherein said correction means corrects the coefficient such that a difference with a coefficient for a neighboring area does not exceed a predetermined value.

44. The image processing method according to claim 32, further comprising a coefficient determination step of determining a coefficient for converting the texture image selected in said selection step in accordance with image data of a corresponding area of the plurality of areas.

45. The image processing method according to claim 44, wherein in said coefficient determination step, the coefficient is determined based on a mean square difference of a pixel density between the texture image selected in said selection step and a corresponding tile area of the plurality of areas.

46. The image processing method according to claim 44, wherein in said coefficient determination step, the coefficient is determined based on an average absolute difference of a pixel density between the texture image selected in said selection step and a corresponding tile area of the plurality of areas.

47. The image processing method according to claim 44, wherein in said coefficient determination step, the coefficient is determined based on a maximum difference of a pixel density between the texture image selected in said selection step and a corresponding tile area of the plurality of areas.

48. The image processing method according to claim 44, wherein in said coefficient determination step, the coefficient is determined based on at least one of the mean square difference of a pixel density, the average absolute difference, and a number of pixels having more than a predetermined pixel density difference between the texture image selected in said selection step and a corresponding tile area of the plurality of areas.

49. The image processing method according to claim 44, wherein in said coefficient determination step, the coefficient is determined so as not to exceed a predetermined value.

50. The image processing method according to claim 44, wherein said coefficient determination step further comprises a correction step of correcting the coefficient based on a coefficient for another area of the plurality of areas.

51. The image processing method according to claim 50, wherein in said correction step, the coefficient is corrected such that a difference with a coefficient for a neighboring area does not exceed a predetermined value.

52. A storage medium which can be read by a computer having a program for executing an image processing method of combining a plurality of texture images in a mosaic-like manner and generating a mosaic image, comprising:

a division step module for dividing an original image into a plurality of areas;

a selection step module for selecting a texture image for each area, having a color similar to each of the plurality of areas divided by said division step module, from a plurality of texture images;

a generation step module for generating a mosaic image in which the texture images selected by said selection step module substitute for the plurality of areas;

a color correction module for correcting a color of the texture image based on an area corresponding to the texture image and a set predetermined coefficient, wherein the predetermined coefficient is $\alpha$, and the color of the texture image is corrected based on a sum of a product of $\alpha$ and a corresponding pixel value of an area in the original image and a product of $(1-\alpha)$ and a corresponding pixel value in a texture image, and wherein $0<\alpha<1$; and a changing step module for changing the predetermined coefficient.

* * * * *

UNITED STATES PATENT AND TRADEMARK OFFICE
CERTIFICATE OF CORRECTION

PATENT NO. : 6,556,210 B1
DATED : April 29, 2003
INVENTOR(S) : Kunihiro Yamamoto et al.

It is certified that error appears in the above-identified patent and that said Letters Patent is hereby corrected as shown below:

Title page,
Item [56], References Cited, U.S. PATENT DOCUMENTS, insert
-- 6,044,181      3/2000 Szeliski et al.
6,249,613 B1    6/2001 Crinon et al.
6,252,610          6/2001 Hussain --.
Item [30], Foreign Application Priority Data,
"10-118629" should read -- 11-118629 --.
"10-118630" should read -- 11-118630 --.

Column 13,
Line 65, "us ed" should read -- used --.

Signed and Sealed this

Twenty-third Day of March, 2004

JON W. DUDAS
*Acting Director of the United States Patent and Trademark Office*